US011483064B2

(12) United States Patent
Wang et al.

(10) Patent No.: US 11,483,064 B2
(45) Date of Patent: Oct. 25, 2022

(54) CLOSED LOOP FREQUENCY CORRECTION FOR NON-TERRESTRIAL NETWORK SYSTEMS

(71) Applicant: QUALCOMM Incorporated, San Diego, CA (US)

(72) Inventors: Xiao Feng Wang, San Diego, CA (US); Jun Ma, San Diego, CA (US); Iyab Issam Sakhnini, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 16/831,699

(22) Filed: Mar. 26, 2020

(65) Prior Publication Data

US 2020/0313754 A1   Oct. 1, 2020

Related U.S. Application Data

(60) Provisional application No. 62/826,326, filed on Mar. 29, 2019.

(51) Int. Cl.
*H04W 4/00* (2018.01)
*H04B 7/185* (2006.01)
(Continued)

(52) U.S. Cl.
CPC ....... *H04B 7/1855* (2013.01); *H04L 27/2657* (2013.01); *H04W 72/121* (2013.01);
(Continued)

(58) Field of Classification Search
CPC .................................................. H04B 7/1855
See application file for complete search history.

(56) References Cited

U.S. PATENT DOCUMENTS 9,326,262 B2 * 4/2016 Li ................ H04L 27/2602
10,439,706 B2 * 10/2019 Michaels .......... H04W 56/0005
(Continued)

FOREIGN PATENT DOCUMENTS

| WO | WO-2017131861    | 8/2017 |
|----|------------------|--------|
| WO | WO-2018055512 A2 | 3/2018 |
| WO | WO-2020101908 A1 | 5/2020 |

OTHER PUBLICATIONS

International Search Report and Written Opinion—PCT/US2020/025452—ISA/EPO—dated Jul. 22, 2020.
(Continued)

*Primary Examiner* — Guang W Li
(74) *Attorney, Agent, or Firm* — Holland & Hart LLP; Kevin M. Donnelly

(57) ABSTRACT

Methods, systems, and devices for wireless communications are described. Generally, the described techniques provide for efficiently determining appropriate uplink frequencies for uplink transmissions to a satellite. As described herein, a wireless communications system may support a closed loop frequency correction scheme where a satellite may provide an uplink frequency correction to a user equipment (UE) such that the UE may be able to identify an appropriate uplink frequency for an uplink transmission. In some implementations, the UE may first transmit an uplink signal to the satellite on an initial uplink frequency, and the satellite may determine a corrected uplink frequency for the UE based on the initial uplink frequency. The satellite may then transmit an indication of the corrected uplink frequency to the UE, and the UE may transmit a second uplink signal based on the corrected uplink frequency.

30 Claims, 15 Drawing Sheets

(51) Int. Cl.
*H04L 27/26* (2006.01)
*H04W 74/08* (2009.01)
*H04W 72/12* (2009.01)
*H04W 84/06* (2009.01)

(52) U.S. Cl.
CPC ... *H04W 72/1268* (2013.01); *H04W 72/1289* (2013.01); *H04W 74/0833* (2013.01); *H04W 84/06* (2013.01)

(56) References Cited

U.S. PATENT DOCUMENTS

| | | | |
|---|---|---|---|
| 11,234,218 B2 | 1/2022 | Sun et al. | |
| 2013/0201016 A1* | 8/2013 | Lo | G08B 27/006 340/502 |
| 2016/0278033 A1* | 9/2016 | Wu | H04B 7/01 |
| 2017/0208600 A1* | 7/2017 | Hsu | H04L 27/0014 |
| 2017/0331664 A1* | 11/2017 | Cheon | H04L 27/26526 |
| 2017/0373907 A1* | 12/2017 | Tan | H04L 5/0091 |
| 2019/0219667 A1* | 7/2019 | Shan | H04B 1/69 |
| 2019/0222302 A1* | 7/2019 | Lin | H04B 7/2125 |
| 2020/0245361 A1* | 7/2020 | Xiong | H04W 74/0833 |
| 2020/0296649 A1* | 9/2020 | Dudzinski | H04W 36/32 |
| 2020/0350983 A1* | 11/2020 | Alasti | G01S 19/40 |
| 2021/0058885 A1* | 2/2021 | Shao | H04W 56/0045 |
| 2021/0083917 A1* | 3/2021 | Konishi | H04B 7/18508 |
| 2022/0007322 A1* | 1/2022 | Marshall | H04J 3/0667 |

OTHER PUBLICATIONS

Nokia, et al., "Overview for NR Supporting NTN", 3GPP Draft, 3GPP TSG RAN WG1 Meeting #96, R1-1901722, 3rd Generation Partnership Project (3GPP), Mobile Competence Centre, 650, Route Des Lucioles, F-06921, Sophia-Antipolis Cedex, France, vol. RAN WG1. No. Athens. Greece; Feb. 25, 2019-Mar. 1, 2019, Feb. 16, 2019 (Feb. 16, 2019), XP051599418, 10 pages, Retrieved from the Internet: URL: http://www.3gpp.org/ftp/tsg%5Fran/WG1%5FRL1/TSGR1%5F96/Docs/R1%2D1901722%2Ezip [retrieved on Feb. 16, 2019], the whole document.

* cited by examiner

CLOSED LOOP FREQUENCY CORRECTION FOR NON-TERRESTRIAL NETWORK SYSTEMS

CROSS REFERENCE

The present Application for Patent claims the benefit of U.S. Provisional Patent Application No. 62/826,326 by WANG et al., entitled "CLOSED LOOP FREQUENCY CORRECTION FOR NON-TERRESTRIAL NETWORK SYSTEMS," filed Mar. 29, 2019, assigned to the assignee hereof, and expressly incorporated by reference herein.

BACKGROUND

The following relates generally to wireless communications and more specifically to closed loop frequency correction for non-terrestrial network (NTN) systems.

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems (for example, NTN systems) may use satellites to communicate with UEs. In some implementations, these satellites may provide coverage for large coverage areas and may be moving at high speeds relative to UEs operating within the NTN (for example, UEs at or relatively near ground level). In such implementations, communications between the satellites and the UEs may be challenging.

SUMMARY

The described techniques relate to improved methods, systems, devices, and apparatuses that support closed loop frequency correction for non-terrestrial network (NTN) systems. Generally, the described techniques provide for efficiently determining appropriate uplink frequencies for uplink transmissions to a satellite. In particular, a wireless communications system may support a closed loop frequency correction scheme where an upstream network node of the NTN, such as a satellite or a ground gateway, may provide an uplink frequency correction to a user equipment (UE), such that the UE may be able to identify an appropriate uplink frequency for an uplink transmission. In some implementations, the UE may first transmit an uplink signal to the satellite on an initial uplink frequency, and the satellite may determine a correction on the uplink frequency for the UE based on the initial uplink frequency. The satellite may then transmit an indication of an uplink frequency correction to the UE. The UE may use the initial uplink frequency and the received uplink frequency correction to determine a new uplink frequency (a corrected uplink frequency). The UE may then transmit a second uplink signal based on the corrected uplink frequency.

A method for wireless communication at a UE is described. The method may include transmitting, based on an initial uplink frequency, a first uplink signal to an upstream network node of an NTN, receiving an indication of an uplink frequency correction in response to the transmitted first uplink signal, determining a corrected uplink frequency based on the initial uplink frequency and the received indication of the uplink frequency correction, and transmitting, based on the corrected uplink frequency, a second uplink signal to the upstream network node.

An apparatus for wireless communication at a UE is described. The apparatus may include a processor, memory in electronic communication with the processor, and instructions stored in the memory. The instructions may be executable by the processor to cause the apparatus to transmit, based on an initial uplink frequency, a first uplink signal to an upstream network node of an NTN, receive an indication of an uplink frequency correction in response to the transmitted first uplink signal, determine a corrected uplink frequency based on the initial uplink frequency and the received indication of the uplink frequency correction, and transmit, based on the corrected uplink frequency, a second uplink signal to the upstream network node.

Another apparatus for wireless communication at a UE is described. The apparatus may include means for transmitting, based on an initial uplink frequency, a first uplink signal to an upstream network node of an NTN, receiving an indication of an uplink frequency correction in response to the transmitted first uplink signal, determining a corrected uplink frequency based on the initial uplink frequency and the received indication of the uplink frequency correction, and transmitting, based on the corrected uplink frequency, a second uplink signal to the upstream network node.

A non-transitory computer-readable medium storing code for wireless communication at a UE is described. The code may include instructions executable by a processor to transmit, based on an initial uplink frequency, a first uplink signal to an upstream network node of an NTN, receive an indication of an uplink frequency correction in response to the transmitted first uplink signal, determine a corrected uplink frequency based on the initial uplink frequency and the received indication of the uplink frequency correction, and transmit, based on the corrected uplink frequency, a second uplink signal to the upstream network node.

In some examples of the method, apparatuses, and non-transitory computer-readable medium described herein, transmitting the first uplink signal may include transmitting a random access preamble, and receiving the indication of the uplink frequency correction may include receiving a response to the transmitted preamble, the response including the indication of the uplink frequency correction. In some examples of the method apparatuses, and non-transitory computer-readable medium described herein, the first uplink signal comprises a sounding reference signal (SRS) or a data signal. In some examples of the method, apparatuses, and non-transitory computer-readable medium described herein, receiving the indication of the uplink frequency correction may include receiving a medium access control (MAC) control element (MAC-CE) including the indication of the uplink frequency correction. Some examples of the method, apparatuses, and non-transitory computer-readable medium described herein may further include operations, features, means, or instructions for receiving a data transmission, where the received MAC-CE is associated with the data transmission.

In some examples of the method, apparatuses, and non-transitory computer-readable medium described herein, the indication of the uplink frequency correction may be received in downlink control information (DCI). In some examples of the method, apparatuses, and non-transitory computer-readable medium described herein, the received DCI further includes an uplink grant for the UE, the second uplink signal transmitted based on the uplink grant and the corrected uplink frequency. In some examples of the method, apparatuses, and non-transitory computer-readable medium described herein, receiving the indication of the uplink frequency correction may include operations, features, means, or instructions for receiving a group uplink frequency correction command in DCI for a group of UEs.

Some examples of the method, apparatuses, and non-transitory computer-readable medium described herein may further include operations, features, means, or instructions for estimating, for a random access preamble, a frequency error associated with communications between the UE and the upstream network node, identifying a target frequency for the random access preamble, and determining the initial uplink frequency based on the identified target frequency and the estimated frequency error, where the transmitted first uplink signal includes the random access preamble. In some examples of the method, apparatuses, and non-transitory computer-readable medium described herein, estimating the frequency error may include operations, features, means, or instructions for determining a relative speed between the upstream network node and the UE, identifying a Doppler shift associated with the determined relative speed, and estimating the frequency error based on the identified Doppler shift.

In some examples of the method, apparatuses, and non-transitory computer-readable medium described herein, uplink transmissions, including the first uplink signal and the second uplink signal, may be transmitted by the UE on at least one of a first set of carrier frequencies, and downlink transmissions, including the indication of the uplink frequency correction, may be received by the UE on at least one of a second set of carrier frequencies different from the first set of carrier frequencies. In some examples of the method, apparatuses, and non-transitory computer-readable medium described herein, the first set of carrier frequencies and the second set of carrier frequencies may be separated in frequency by at least one (1) gigahertz. In some examples of the method, apparatuses, and non-transitory computer-readable medium described herein, the first set of carrier frequencies and the second set of carrier frequencies may be in a $K_a$ band.

A method for wireless communication at an upstream network node of an NTN is described. The method may include receiving a first uplink signal from a UE at a first frequency different from an expected frequency for uplink transmissions, determining an uplink frequency correction for the UE based on the received first uplink signal, and transmitting an indication of the uplink frequency correction to the UE.

An apparatus for wireless communication at an upstream network node of an NTN is described. The apparatus may include a processor, memory in electronic communication with the processor, and instructions stored in the memory. The instructions may be executable by the processor to cause the apparatus to receive a first uplink signal from a UE at a first frequency different from an expected frequency for uplink transmissions, determine an uplink frequency correction for the UE based on the received first uplink signal, and transmit an indication of the uplink frequency correction to the UE.

Another apparatus for wireless communication at an upstream network node of an NTN is described. The apparatus may include means for receiving a first uplink signal from a UE at a first frequency different from an expected frequency for uplink transmissions, determining an uplink frequency correction for the UE based on the received first uplink signal, and transmitting an indication of the uplink frequency correction to the UE.

A non-transitory computer-readable medium storing code for wireless communication at an upstream network node of an NTN is described. The code may include instructions executable by a processor to receive a first uplink signal from a UE at a first frequency different from an expected frequency for uplink transmissions, determine an uplink frequency correction for the UE based on the received first uplink signal, and transmit an indication of the uplink frequency correction to the UE.

Some examples of the method, apparatuses, and non-transitory computer-readable medium described herein may further include operations, features, means, or instructions for receiving, in response to the transmitted indication of the uplink frequency correction, a second uplink signal from the UE at the expected frequency. In some examples of the method, apparatuses, and non-transitory computer-readable medium described herein, receiving the first uplink signal may include receiving a random access preamble, and transmitting the indication of the uplink frequency correction may include transmitting a response to the received random access preamble, the response including the indication of the uplink frequency correction. In some examples of the method apparatuses, and non-transitory computer-readable medium described herein, the first uplink signal comprises an SRS or a data signal.

In some examples of the method, apparatuses, and non-transitory computer-readable medium described herein, transmitting the indication of the uplink frequency correction may include operations, features, means, or instructions for transmitting a MAC-CE including the indication of the uplink frequency correction. Some examples of the method, apparatuses, and non-transitory computer-readable medium described herein may further include operations, features, means, or instructions for transmitting the MAC-CE with an associated data signal.

In some examples of the method, apparatuses, and non-transitory computer-readable medium described herein, the indication of the uplink frequency correction may be transmitted in DCI. In some examples of the method, apparatuses, and non-transitory computer-readable medium described herein, the transmitted DCI further includes an uplink grant for the UE. In some examples of the method, apparatuses, and non-transitory computer-readable medium described herein, the indication of the uplink frequency correction may be a group uplink frequency correction command, and the DCI may be for a group of UEs.

In some examples of the method, apparatuses, and non-transitory computer-readable medium described herein, determining the uplink frequency correction for the UE may include determining a difference in frequency between the first frequency and the expected frequency, where the uplink frequency correction includes the difference in frequency. In some examples of the method, apparatuses, and non-transitory computer-readable medium described herein, determining the uplink frequency correction for the UE may include operations, features, means, or instructions for estimating a relative speed between the UE and the upstream network node, identifying a Doppler shift associated with the determined relative speed, and determining the uplink frequency correction based on the expected frequency and the identified Doppler shift.

In some examples of the method, apparatuses, and non-transitory computer-readable medium described herein, the uplink transmissions, including the first uplink signal, may be received on at least one of a first set of carrier frequencies, and downlink transmissions, including the indication of the uplink frequency correction, may be transmitted on at least one of a second set of carrier frequencies different from the first set of carrier frequencies. In some examples of the method, apparatuses, and non-transitory computer-readable medium described herein, the first set of carrier frequencies and the second set of carrier frequencies may be separated in frequency by at least one (1) gigahertz. In some examples of the method, apparatuses, and non-transitory computer-readable medium described herein, the first set of carrier frequencies and the second set of carrier frequencies may be in a $K_a$ band.

DETAILED DESCRIPTION

Figure 1:
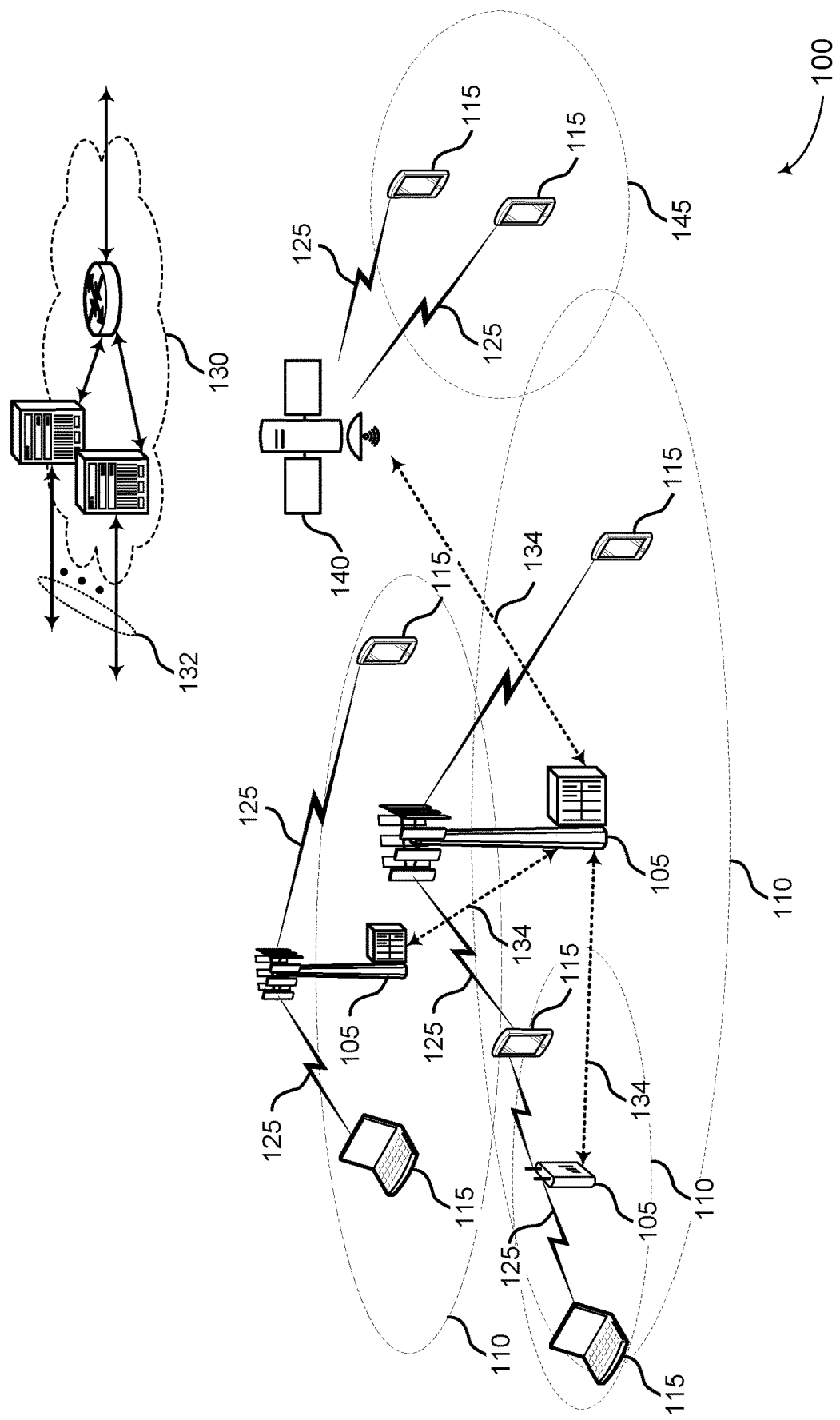
FIG. 1 illustrates an example of a wireless communications system that supports closed loop frequency correction for non-terrestrial network (NTN) systems in accordance with aspects of the present disclosure.

Some wireless communications systems (for example, non-terrestrial networks (NTNs)) may use satellites (which may broadly refer to any high-altitude platform) to communicate with user equipment (UEs). In some implementations, these satellites may provide coverage for large coverage areas and may be moving at high speeds relative to UEs operating within an NTN (for example, UEs at or relatively near ground level). In such implementations, when a UE attempts to determine an uplink frequency for an uplink transmission to a satellite (for example, based on a downlink frequency of a downlink transmission received from the satellite), and the UE transmits the uplink transmission to the satellite at the determined uplink frequency, the frequency at which the uplink transmission is received at the satellite may be offset from a target uplink frequency based on the location of the UE in a geographic coverage area and based on Doppler effects. Moreover, because downlink and uplink transmissions may use carriers that are widely spaced in frequency, the UE may not be able to rely on measurements of downlink transmissions to determine an uplink frequency correction. As a result, uplink transmissions from the UE may have frequency errors, which may cause inter-carrier interference and may limit throughput in an NTN.

As described herein, a UE may support efficient techniques for determining appropriate uplink frequencies for uplink transmissions to a satellite. In particular, a wireless communications system may support a closed loop frequency correction scheme where a satellite may provide an uplink frequency correction to a UE such that the UE may be able to identify an appropriate uplink frequency for an uplink transmission. In some implementations, the UE may first transmit an uplink signal to the satellite on an initial uplink frequency, and the satellite may determine a correction on the uplink frequency for the UE based on the initial uplink frequency. The satellite may then transmit an indication of the corrected uplink frequency to the UE, and the UE may transmit a second uplink signal based on the corrected uplink frequency. Using these techniques, a UE may transmit an uplink signal at an appropriate uplink frequency (for example, the corrected uplink frequency) such that the uplink signal is received by a satellite on a target uplink frequency (for example, after frequency errors), and inter-carrier interference in an NTN may be reduced. The target uplink frequency may be a frequency allocated for the uplink signal (for example, expected frequency). Thus, when the uplink signal is received by the satellite on the target frequency, the uplink signal may not interfere with other signals expected by the satellite at other frequencies.

Aspects of the disclosure introduced above are described below in the context of a wireless communications system. Examples of processes and signaling exchanges that support closed loop frequency correction for NTN systems are then described. Aspects of the disclosure are further illustrated by and described with reference to apparatus diagrams, system diagrams, and flowcharts that relate to closed loop frequency correction for NTN systems.

FIG. 1 illustrates an example of a wireless communications system 100 that supports closed loop frequency correction in accordance with aspects of the present disclosure. The wireless communications system 100 includes base stations 105, UEs 115, one or more satellites 140, and a core network 130. In some examples, the wireless communications system 100 may include a Long-Term Evolution (LTE) network, an LTE-Advanced (LTE-A) network, an LTE-A Pro network, a New Radio (NR) network, or an NTN network. In some implementations, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. For instance, each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 or downlink transmissions from a base station 105 to a UE 115. Downlink transmissions may also be called forward link transmissions while uplink transmissions may also be called reverse link transmissions.

As discussed above, wireless communications system 100 may include an NTN network which may utilize one or more satellites 140. In some implementations, a satellite may broadly refer to a high-altitude platform such as extra-atmospheric orbiting satellites, or intra-atmosphere satellites including, for example, high-altitude balloons or aircraft. The satellites 140 may relay communications between base stations 105 and UEs 115. In some examples, satellites 140 may include aspects of base stations 105 or may perform functions ascribed herein to base stations 105. Each satellite 140 may be associated with a geographic coverage area 145 in which communications with various UEs 115 are supported. For instance, each satellite may provide communication coverage for a respective geographic coverage area 145 via communication links 125, and communication links 125 between a satellite 140 and a UE 115 may utilize one or more carriers. In some implementations, a geographic coverage area 145 may be an example of or may share the same properties of a geographic coverage area 110.

In an NTN, communication links 125 shown in wireless communications system 100 may include upstream transmissions from a UE 115 to a network node (for example, to a satellite 140 or to a base station 105 via a satellite 140), or downstream transmissions to a UE 115 from a network node (for example, from a satellite 140 or from a base station 105 via a satellite 140). In some implementations, transmissions from the ground (for example, from a UE 115 or base station 105) to a satellite 140 may be referred to as uplink transmissions, and transmissions from a satellite 140 to the ground (for example, to a UE 115 or base station 105) may be referred to as downlink transmissions. Thus, depending on whether a gateway (for example, a base station 105) is collocated with (for example, included in) a satellite 140 or is at the ground, either upstream or downstream transmissions may include a mix of uplink and downlink transmissions. Downstream transmissions may also be called forward link transmissions while upstream transmissions may also be called reverse link transmissions. In some implementations, a geographic coverage area 145 may be an area associated with a transmission beam of a satellite 140 and may be referred to as a beam footprint.

The geographic coverage area 110 for a base station 105 or the geographic coverage area 145 for a satellite 140 may be divided into sectors making up a portion of the geographic coverage area, and each sector may be associated with a cell. For example, each base station 105 may provide communication coverage for a macro cell, a small cell, a hot spot, or other types of cells, or various combinations thereof. In some examples, a base station 105 or a satellite 140 may be movable and therefore provide communication coverage for a moving geographic coverage area 110 or 145. In some examples, different geographic coverage areas associated with different technologies may overlap, and overlapping geographic coverage areas associated with different technologies may be supported by the same base station 105 or by different base stations 105. The wireless communications system 100 may include, for example, a heterogeneous LTE/LTE-A/LTE-A Pro network, an NR network, or an NTN in which different types of base stations 105 or satellites 140 provide coverage for various geographic coverage areas.

The term "cell" may refer to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some implementations, the term "cell" may refer to a portion of a geographic coverage area 110 (for example, a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system (UMTS) terrestrial radio access (E-UTRA) absolute radio frequency channel number (EARFCN)) and may be positioned according to a channel raster for discovery by UEs 115. Carriers may be downlink or uplink (for example, in a frequency division duplexing (FDD) mode), or be configured to carry downlink and uplink communications (for example, in a time division duplexing (TDD) mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (for example, according to narrowband communications). In some implementations, UEs 115 may be designed to support critical functions (for example, mission critical functions), and a wireless communications system 100 may be configured to provide ultra-reliable communications for these functions.

In some implementations, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some implementations, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In other implementations, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). In addition, base stations 105 may communicate with one another over backhaul links 134 (for example, via an X2, Xn, or other interface) either directly (for example, directly between base stations 105) or indirectly (for example, via core network 130), and base stations 105 may communicate with satellites 140 wirelessly over backhaul links 134 (for example, via an X2 or other interface).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (NAS) (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some implementations, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some implementations, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some implementations, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on FDD, TDD, or a combination of both.

In some implementations, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Media Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds in LTE and $T_c=T_s/64$ in NR. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol period may contain 2048 sampling periods. In some implementations, a subframe may be the smallest scheduling unit of the wireless communications system 100 and may be referred to as a transmission time interval (TTI). In other implementations, a smallest scheduling unit of the wireless communications system 100 may be shorter than a subframe or may be dynamically selected (for example, in bursts of shortened TTIs (sTTIs) or in selected component carriers using sTTIs).

Figure 2:
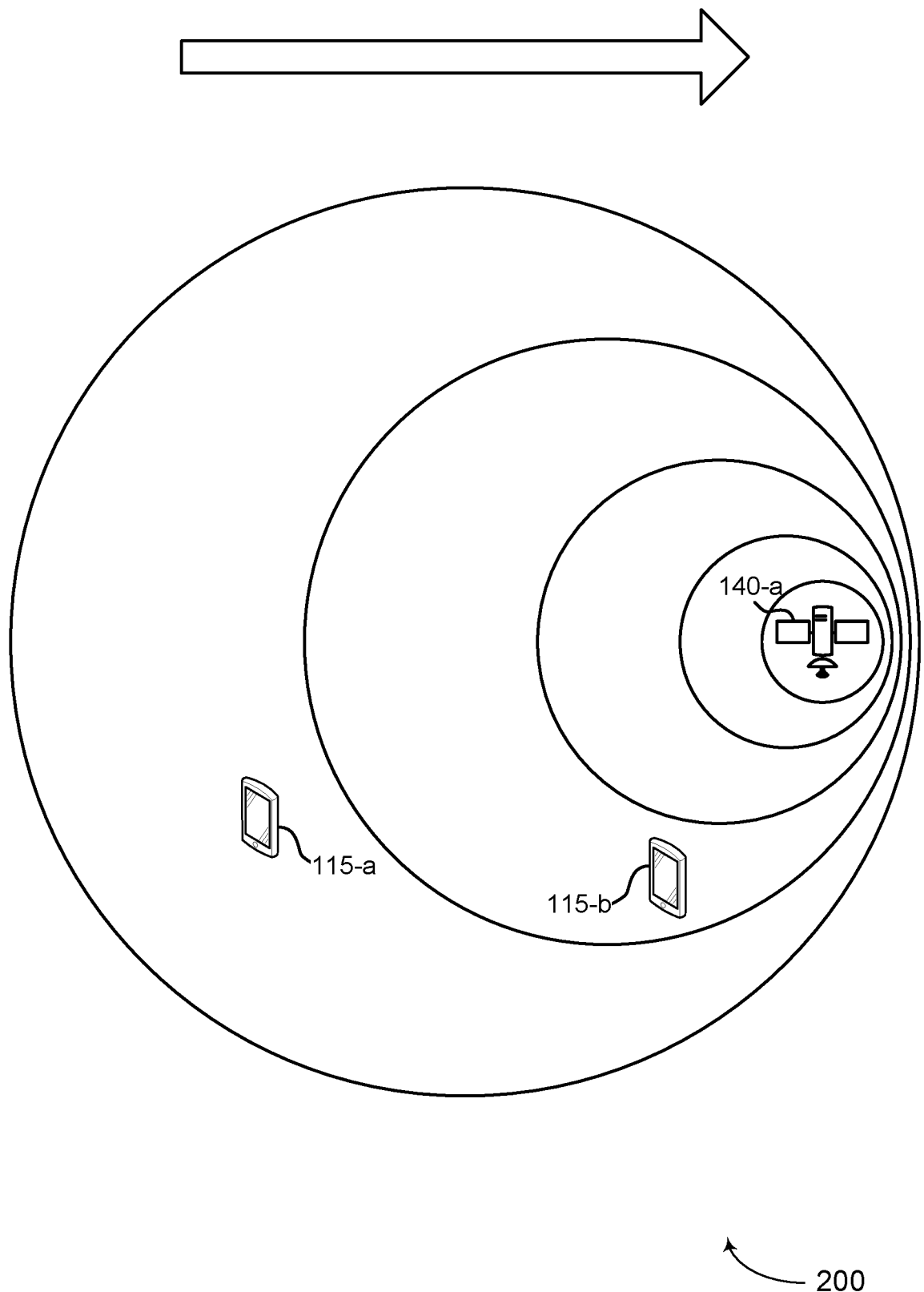
FIG. 2 illustrates an example of a geographic coverage area of a satellite in accordance with aspects of the present disclosure.

In an NTN network in wireless communications system 100, the frequency of a transmission from a UE 115 to a satellite 140 may vary based on Doppler effects, where the Doppler effects may depend on the trajectory and speed of the satellite and the location of the UE 115 relative to the satellite 140 at a point in time. FIG. 2 illustrates an example of Doppler effects 200 in accordance with aspects of the present disclosure. In the example of FIG. 2, a satellite 140-a may be moving in an orbit (for example, in a low earth orbit (LEO)). As a result, the Doppler shift seen by a UE 115-a in one location may be very different from the Doppler shift seen by a UE 115-b in another location. In some implementations, the Doppler shift may be as high as 600 kHz.

Figure 3:
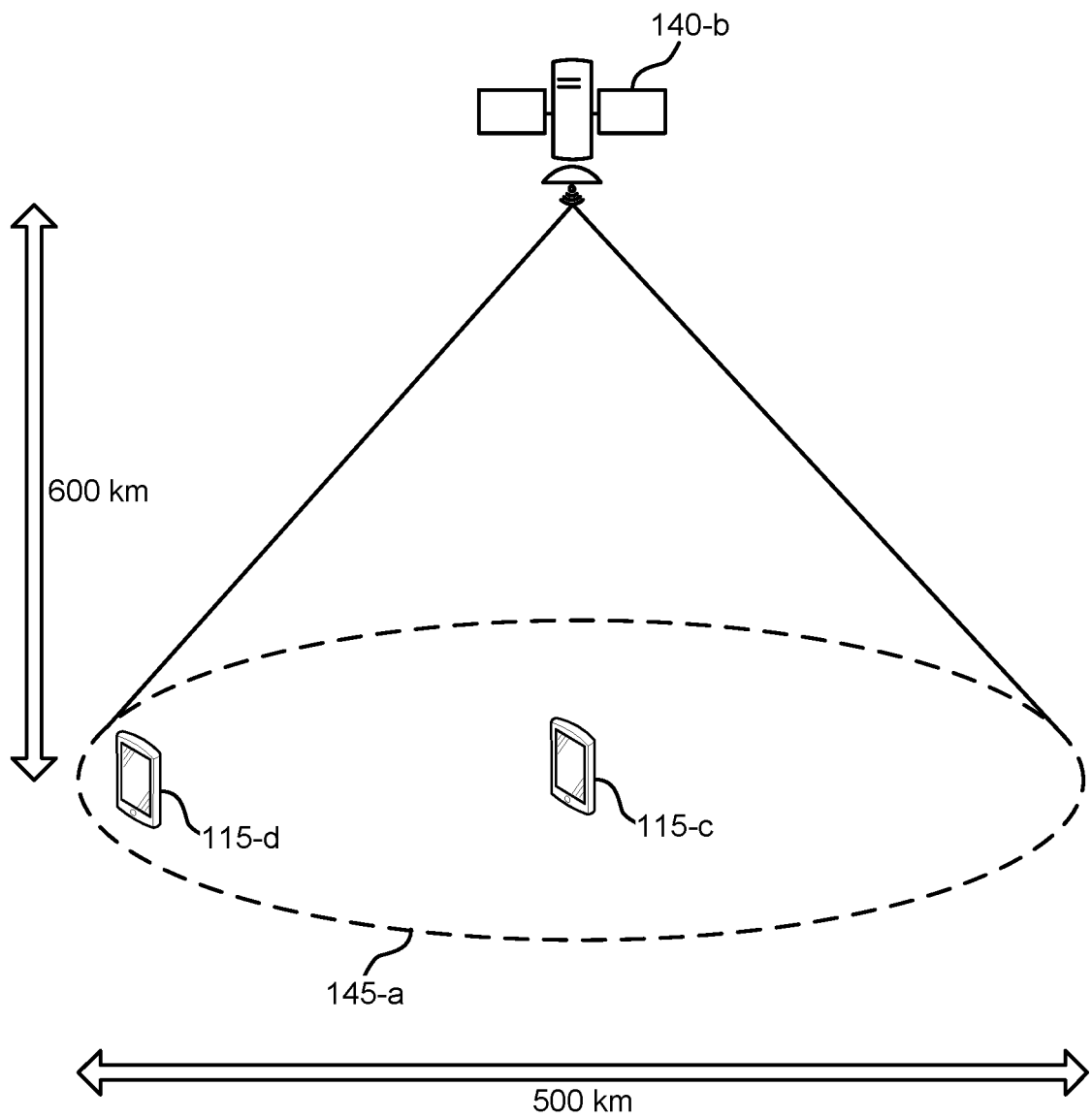
FIG. 3 illustrates an example of Doppler effects in accordance with aspects of the present disclosure.

In addition, the UEs 115 within a coverage area may experience largely different Doppler shifts. FIG. 3 illustrates an example of a geographic coverage area 145-a of a satellite 140-b in accordance with aspects of the present disclosure. In the example of FIG. 3, with a 600 km satellite orbit altitude, uplink carrier frequency at 30 GHz, and a 500 km beam coverage width, the resulting frequency offset difference between a beam center UE 115-c and a beam edge UE 115-d may be approximately 289 kHz. Thus, if the Doppler effects are unknown for a downlink transmission, a UE 115 may not be able to determine the desired uplink frequency for an uplink transmission based on a downlink frequency of the downlink transmission (for example, when the UE 115 is synchronized to the downlink frequency). Further, if a frequency offset due to Doppler effects is translated from a downlink carrier frequency to a higher uplink carrier frequency, the frequency offset (or error) may be amplified.

As can be seen in the examples described above with reference to FIGS. 2 and 3, it may be challenging for a UE 115 to identify appropriate uplink frequencies for uplink transmissions to a satellite 140. In particular, if a UE 115 attempts to determine an uplink frequency for an uplink transmission to a satellite, and the UE 115 transmits the uplink transmission to the satellite at the determined uplink frequency, the frequency at which the uplink transmission is received at the satellite may be offset from a target frequency based on the location of the UE 115 in a geographic coverage area 145 due to Doppler effects. As a result, uplink transmissions from UEs 115 in an NTN may have frequency errors, which may cause inter-carrier interference and may limit throughput in the network. Further, even if a UE 115 is able to determine an appropriate uplink frequency for an uplink transmission based on internal calculations (for example, based on identifying a location of the UE 115 and the trajectory of a satellite 140), such calculations may be complex and may drain the power of the UE 115. As described herein, UEs 115 in wireless communications system 100 may support efficient techniques for identifying appropriate uplink frequencies (for example, with limited frequency errors) for uplink transmissions to a satellite 140.

Particular implementations of the subject matter described in this disclosure can be implemented to realize one or more of the following potential advantages. For instance, using the techniques described herein for transmitting a first uplink signal, receiving an uplink frequency correction, and transmitting a second uplink signal based on the uplink frequency correction, a UE 115 may be able to identify an appropriate uplink frequency for an uplink transmission (for example, such that the uplink transmission is received by the satellite at a frequency that is at least close to a target uplink frequency). As such, the chances that the uplink transmission interferes with other transmissions in a wireless system may be reduced, resulting in improved throughput. The first uplink signal may be transmitted in a variety of ways such as in a random access preamble, a sounding reference signal (SRS) transmission, or a data transmission. Similarly, the frequency correction may be received in a variety of ways such as in a MAC-CE or in downlink control information (DCI) carried by a physical downlink control channel (PDCCH).

One example of an advantage of transmitting the first uplink signal in a random access preamble and receiving the indication of the uplink frequency correction in a response to the transmitted random access preamble is that the UE may be able to identify appropriate uplink frequencies for initial uplink transmissions to a base station 105. An advantage of receiving the indication of the uplink frequency correction in a MAC-CE is that the UE may be able to identify appropriate uplink frequencies for both dynamically scheduled uplink transmissions and uplink transmissions configured without PDCCH to a base station 105. Further, the use of a MAC-CE for indicating an uplink frequency correction may allow a UE to identify an appropriate uplink frequency for an uplink transmission without using DCI resources which may already be used for many different types of control information and may be complicated to decode. However, an advantage of receiving the indication of the uplink frequency correction in DCI is that the UE may be able to identify appropriate uplink frequencies for dynamically scheduled uplink transmissions based on the same DCI used to schedule the uplink transmissions.

Figure 4:
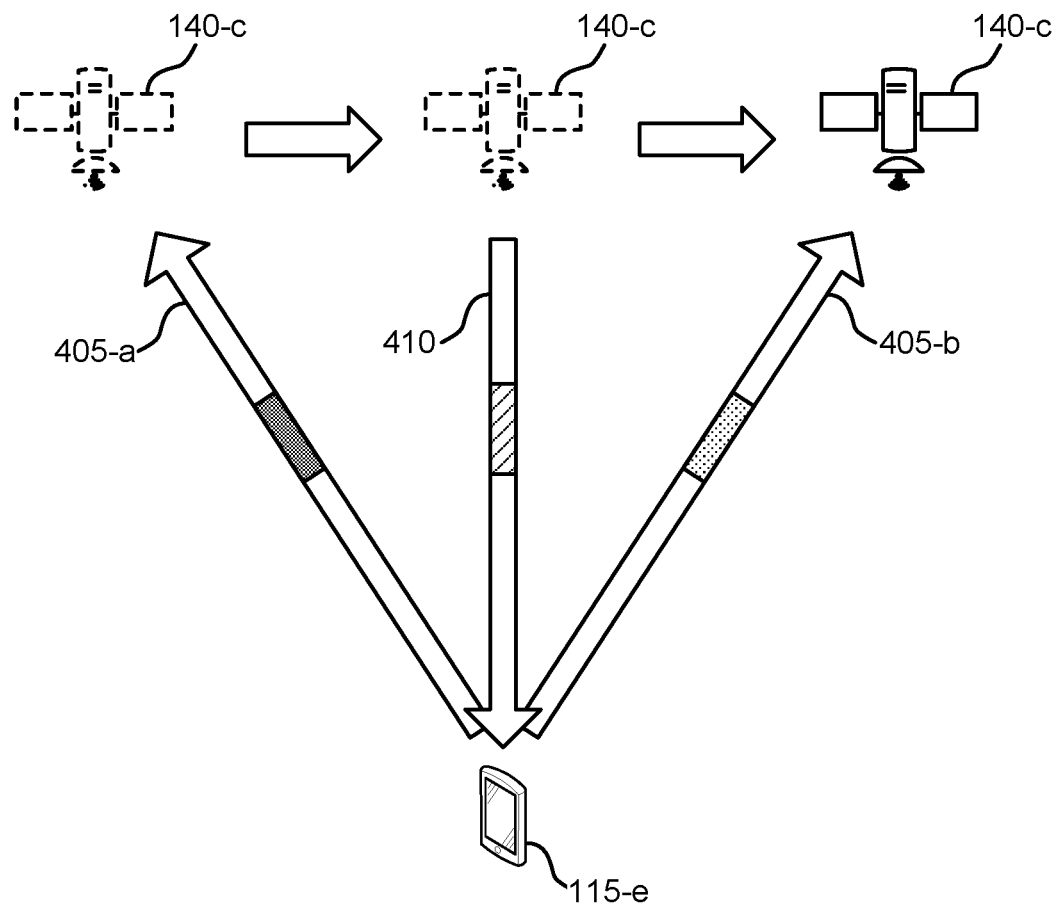
FIG. 4 illustrates an example of a wireless communications system that supports closed loop frequency correction for NTN systems in accordance with aspects of the present disclosure.

FIG. 4 illustrates an example of an NTN wireless communications system 400 that supports closed loop frequency correction in accordance with aspects of the present disclosure. NTN wireless communications system 400 includes satellite 140-c, which may be an example of a satellite 140 described with reference to FIGS. 1-3. NTN wireless communications system 400 also includes UE 115-e, which may be an example of a UE 115 described with reference to FIGS. 1-3. UE 115-e may communicate on the uplink with satellite 140-c on uplink carriers 405, and satellite 140-c may communicate on the downlink with UE 115-e on downlink carriers 410.

NTN wireless communications system 400 may implement aspects of wireless communications system 100. For example, UE 115-e in NTN wireless communications system 400 may support efficient techniques for identifying appropriate uplink frequencies (for example, with limited or no frequency errors) for uplink transmissions to satellite 140-c. In particular, NTN wireless communications system 400 may support a closed loop frequency correction scheme where satellite 140-c may provide an uplink frequency correction to UE 115-e such that UE 115-e may be able to identify an appropriate uplink frequency for an uplink transmission.

In the example of FIG. 4, as part of the closed loop frequency correction scheme, UE 115-e may first transmit an uplink signal 415 to satellite 140-c. Based on the first uplink signal 415, satellite 140-c may determine an uplink frequency correction 420 for the UE 115-e. For instance, satellite 140-c may identify a location of the UE 115-e (for example, based on an indication from the UE 115-e or otherwise) and the trajectory of the satellite 140-c, and may determine the uplink frequency correction 420 based on calculations performed using the location and trajectory. Satellite 140-c may then transmit an indication of the uplink frequency correction 420 to UE 115-e. Accordingly, UE 115-e may determine a corrected uplink frequency for transmission of a second uplink signal 425, and UE 115-e may transmit the second uplink signal 425 based on the corrected uplink frequency.

In some implementations, the first uplink signal 415 may be a random access preamble, and UE 115-e may transmit the random access preamble as part of a random access procedure (for example, in an attempt to connect, synchronize, reconnect, etc., to satellite 140-c for subsequent communications). The first uplink signal 415 may be a first transmission of a four-step random access procedure. A four-step random access procedure may include four exchanges between UE 115-e and satellite 140-c, including the UE 115-e transmitting a random access preamble, receiving a random access response (RAR), transmitting an RRC connection request, and receiving a MAC-CE for contention resolution. In another example, the first uplink signal 415 may be a first transmission of a two-step random access procedure (for example, where a payload may be transmitted along with the random access preamble). A two-step random access procedure may include two exchanges between UE 115-e and satellite 140-c, including the UE 115-e transmitting a random access preamble (for example, with data) and receiving a RAR.

Satellite 140-c may then transmit a response to the random access preamble including the uplink frequency correction 420. In some implementations, the uplink frequency correction 420 in the random access response may be a large adjustment compared to subsequent uplink frequency corrections (for example, because the random access preamble may be the first uplink transmission to the satellite 140-c). Further, the uplink frequency correction 420 in the random access response may be more granular than subsequent uplink frequency corrections (for example, because additional bits in the random access response may not be as expensive (for example, in time-frequency resources) as additional bits in other control messages that are transmitted more frequently).

Once UE 115-e identifies an initial uplink frequency correction 420 based on a RAR received from satellite 140-c, UE 115-e may use the uplink frequency correction 420 for a subsequent uplink transmission (for example, second uplink signal 425), if scheduled. UE 115-e may then continue to receive periodic or aperiodic uplink frequency corrections 420 from satellite 140-c for subsequent uplink transmissions. For instance, when UE 115-e transmits a periodic SRS or data transmission, satellite 140-c may respond with another uplink frequency correction 420 for UE 115-e to use for a subsequent uplink transmission. Alternatively, satellite 140-d may transmit subsequent periodic or aperiodic uplink frequency corrections 420 to UE 115-e without first receiving corresponding uplink signals from UE 115-e.

In some aspects, the subsequent uplink frequency corrections 420 described above (for example, received after the initial uplink frequency correction) may be received in MAC control elements (MAC-CEs) or DCI. For instance, prior to an uplink data transmission, UE 115-e may receive an uplink frequency correction 420 for the uplink data transmission in a MAC-CE (for example, where the MAC-CE may be a part of a downlink data transmission). Alternatively, prior to an uplink data transmission, UE 115-e may receive an uplink frequency correction 420 for the uplink data transmission in a DCI message. In some implementations, the DCI that includes the uplink frequency correction 420 may be a unicast DCI (for example, including an individual frequency correction command for UE 115-e), and, in other implementations, the DCI that includes the uplink frequency correction may be a group DCI (for example, with a designated DCI format including a group frequency correction command for multiple UEs 115).

In any case, once UE 115-e identifies an uplink frequency correction, UE 115-e may transmit an uplink data transmission based on the uplink frequency correction. In some implementations, an uplink frequency correction 420 in a MAC-CE or DCI message may be a small adjustment compared to an initial uplink frequency correction received in a random access response. Further, the uplink frequency correction 420 in the MAC-CE or DCI may be less granular than an initial uplink frequency correction received in a random access response. In some aspects, although satellite 140-c may be constantly moving in orbit and may be far away from UE 115-e, the long round-trip time (RTT) or round-trip delay may marginally affect the accuracy of the frequency correction. For instance, in a potential worst-case scenario, for a 600 km satellite orbit altitude and 30 GHz carrier frequency, the highest Doppler shift slew rate may be approximately 8.2 Hz/ms. Thus, even with a 50 ms RTT, the residual frequency error is at most around 400 Hz, which may not significantly affect receiver performance.

Figure 5:
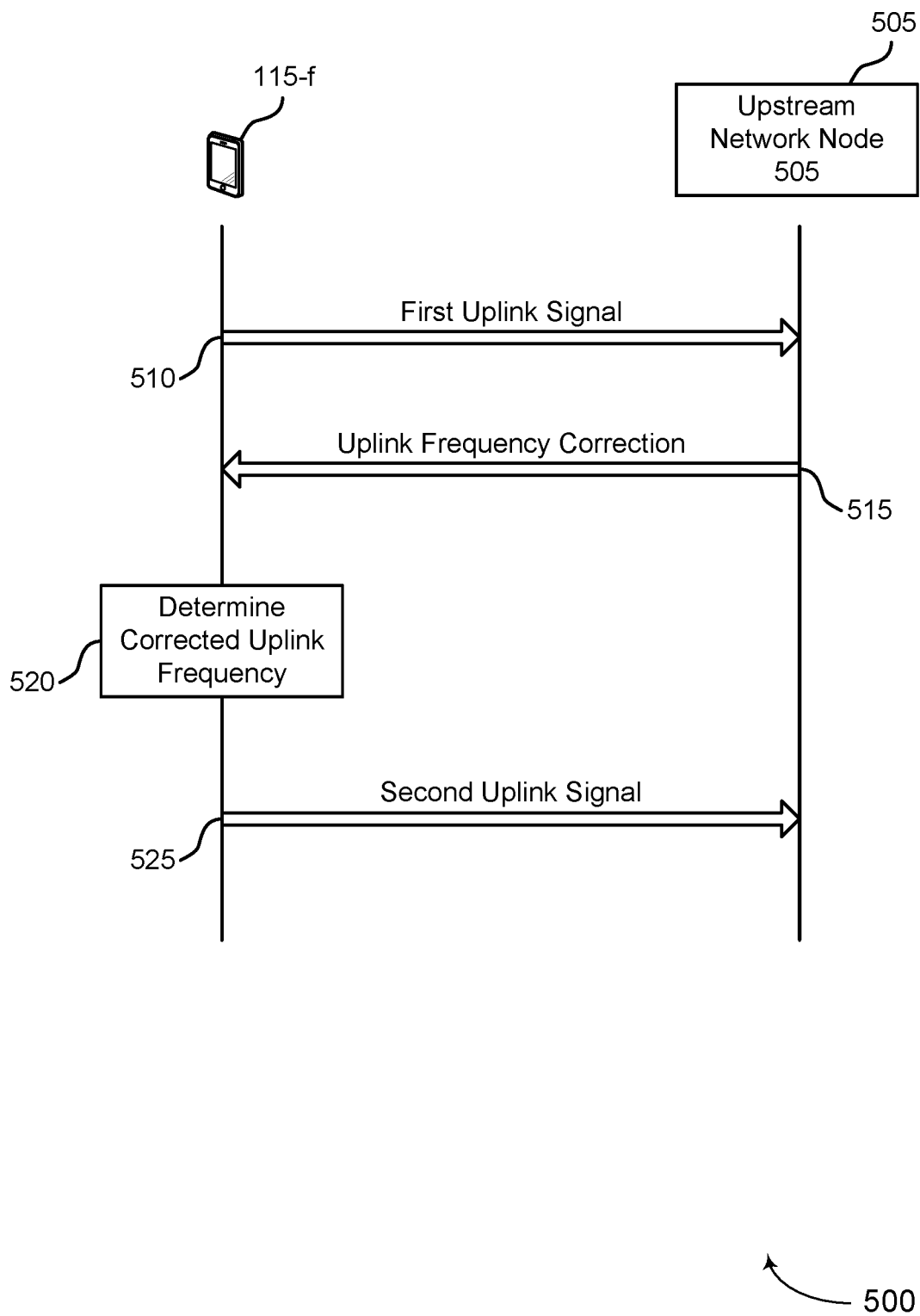
FIG. 5 illustrates an example of a process flow that supports closed loop frequency correction for NTN systems in accordance with aspects of the present disclosure.

FIG. 5 illustrates an example of a process flow 500 that supports closed loop frequency correction for NTN systems in accordance with aspects of the present disclosure. Process flow 500 illustrates aspects of techniques performed by an upstream network node 505 of an NTN network, which may be an example of a satellite 140 described with reference to FIGS. 1-4 or another network node in communication with a satellite 140, such as a base station 105 or gateway. Process flow 500 also illustrates aspects of techniques performed by UE 115-f, which may be an example of a UE 115 described with reference to FIGS. 1-4. Process flow 500 may implement aspects of wireless communications system 100. For example, UE 115-f in process flow 500 may support efficient techniques for identifying appropriate uplink frequencies (for example, with limited or no frequency errors) for uplink transmissions to upstream network node 505.

At 510, UE 115-f may transmit a first uplink signal to upstream network node 505 based on an initial uplink frequency. In some aspects, when UE 115-f determines to perform a random access procedure to connect to upstream network node 505, and the first uplink signal is a random access preamble, UE 115-f may estimate a frequency error associated with communications between UE 115-f and upstream network node 505. UE 115-f may then identify a target frequency for the random access preamble, and UE 115-f may determine the initial uplink frequency for transmitting the random access preamble based on the identified target frequency and the estimated frequency error. In some implementations, to estimate the frequency error, UE 115-f may first determine a relative speed between the upstream network node 505 and UE 115-f (for example, based on information regarding the orbit of a satellite), and the UE 115-f may identify a Doppler shift associated with the determined relative speed. UE 115-f may then estimate the frequency error based on the identified Doppler shift.

At 515, upstream network node 505 may then transmit, and UE 115-f may receive, an indication of an uplink frequency correction in response to the transmitted first uplink signal. In some implementations, the first uplink signal may be a random access preamble, and UE 115-f may receive the indication of the uplink frequency correction in response to the transmitted preamble (for example, in a RAR message, also known as a random access message2). In other implementations, UE 115-f may receive the indication of the uplink frequency correction in a MAC-CE (for example, in a MAC-CE associated with a data transmission received from upstream network node 505). In yet other implementations, UE 115-f may receive the indication of the uplink frequency correction in DCI. For instance, UE 115-f may receive the indication of the uplink frequency correction in a unicast DCI that includes an uplink grant for the UE 115-f for transmission of a second uplink signal. Alternatively, the indication of the uplink frequency correction may be a group uplink frequency correction command received in a group DCI (for example, group-common DCI (GC-DCI)) for a group of UEs 115 (for example, including UE 115-f).

At 520, UE 115-f may then determine a corrected uplink frequency based on the initial uplink frequency and the received indication of the uplink frequency correction, and, at 525, UE 115-f may transmit a second uplink signal to upstream network node 505 based on the corrected uplink frequency. In the examples described above, uplink transmissions, including the first uplink signal transmission and the second uplink signal transmission, may be transmitted by UE 115-f on one of a first set of carriers. Downlink transmissions, including the indication of the uplink frequency correction, may be received by UE 115-f on one of a second set of carrier frequencies different from the first set of carrier frequencies.

In some implementations, the first set of carriers and the second set of carriers may be separated in frequency by at least 1 GHz, and the first and second sets of carrier frequencies may be in a $K_a$ band. The $K_a$ band (for example, from about 26 to 40 GHz) may include frequency ranges licensed for satellite communications, including separate frequency ranges licensed for uplink communications and frequency ranges licensed for downlink communications. In some implementations, for $K_a$ band satellite communications, downlink and uplink frequencies may be largely separated (for example, 20 GHz for downlink communications and 30 GHz for uplink communications).

In other examples, the first and second sets of carrier frequencies may be in another frequency range licensed for satellite communications, such as a frequency range of the $K_u$ band (for example, from about 12 to 18 GHz) or the K band (for example, from about 18 to 26 GHz). In these examples, the downlink carrier frequencies and uplink carrier frequencies may also have a large separation in frequency (for example, greater than about 1 GHz). The downlink carrier frequencies and the uplink carrier frequencies may also be in different bands, for example where the downlink is in the K band and the uplink is the $K_a$ band.

Figure 6:
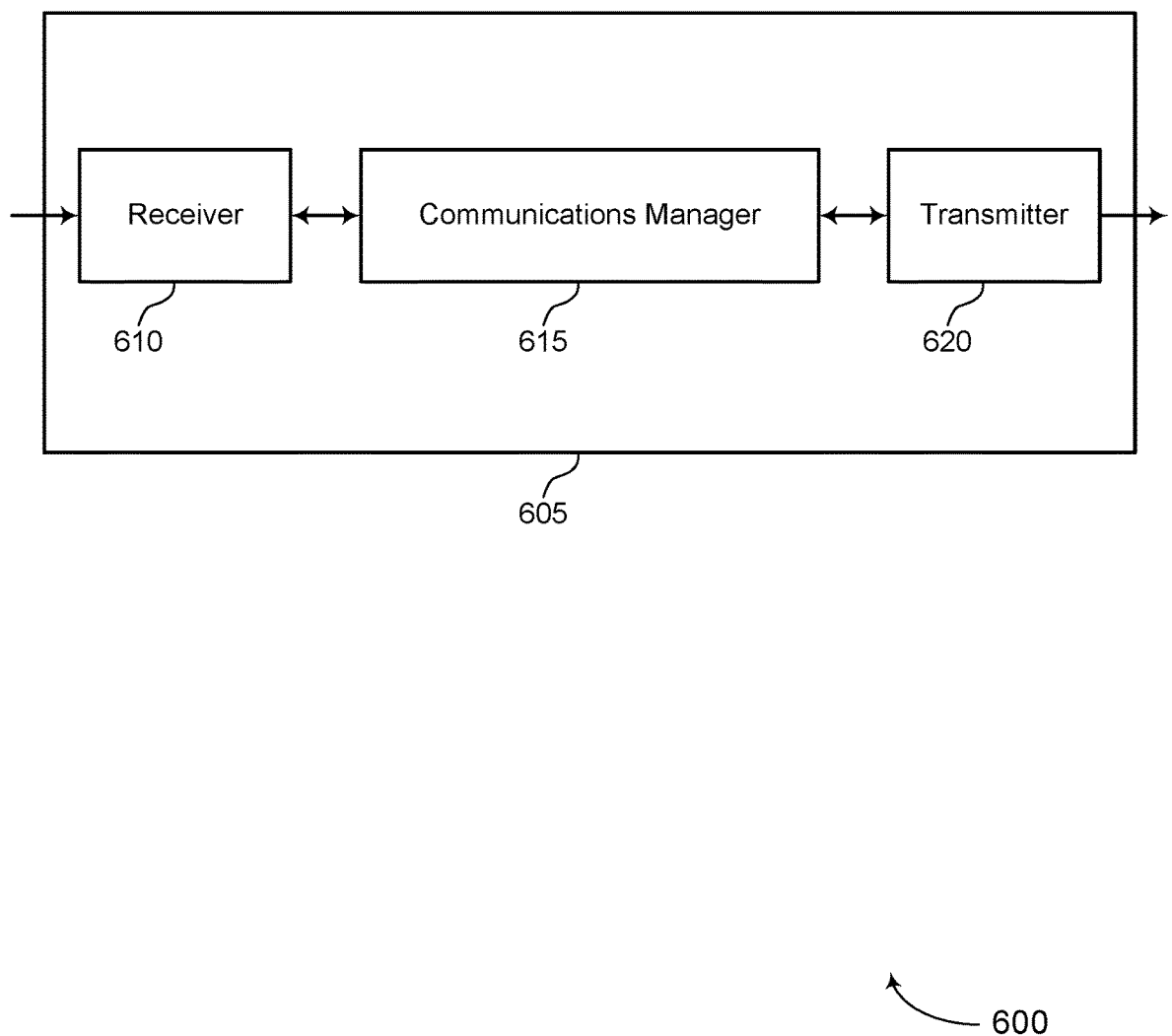
FIGS. 6 and 7 show block diagrams of devices that support closed loop frequency correction for NTN systems in accordance with aspects of the present disclosure.

FIG. 6 shows a block diagram 600 of a device 605 that supports closed loop frequency correction for NTN systems in accordance with aspects of the present disclosure. The device 605 may be an example of aspects of a UE 115 as described herein. The device 605 may include a receiver 610, a communications manager 615, and a transmitter 620. The communications manager 615 can be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to closed loop frequency correction for NTN systems, etc.). The receiver 610 may pass the received information, or information derived from it, to other components of the device 605. The receiver 610 may be an example of aspects of the transceiver 920 described with reference to FIG. 9. The receiver 610 may utilize a single antenna or a set of antennas.

The communications manager 615 may transmit, based on an initial uplink frequency, a first uplink signal to an upstream network node of an NTN, and receive an indication of an uplink frequency correction in response to the transmitted first uplink signal. The communications manager 615 may then determine a corrected uplink frequency based on the initial uplink frequency and the received indication of the uplink frequency correction, and transmit, based on the corrected uplink frequency, a second uplink signal to the upstream network node. The communications manager 615 may be an example of aspects of the communications manager 910 described herein.

The communications manager 615, or its sub-components, may be implemented in hardware, code (for example, software or firmware) executed by a processor, or any combination thereof. If at least partially implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be collocated in a single device (for example, in a single chip, chipset, system-on-chip (SoC) or integrated circuit (IC) package) or physically located at different locations, including being distributed such that portions of functions are implemented at different physical locations by one or more respective physical components (such as in other chips, chipsets, SoCs or IC packages). In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
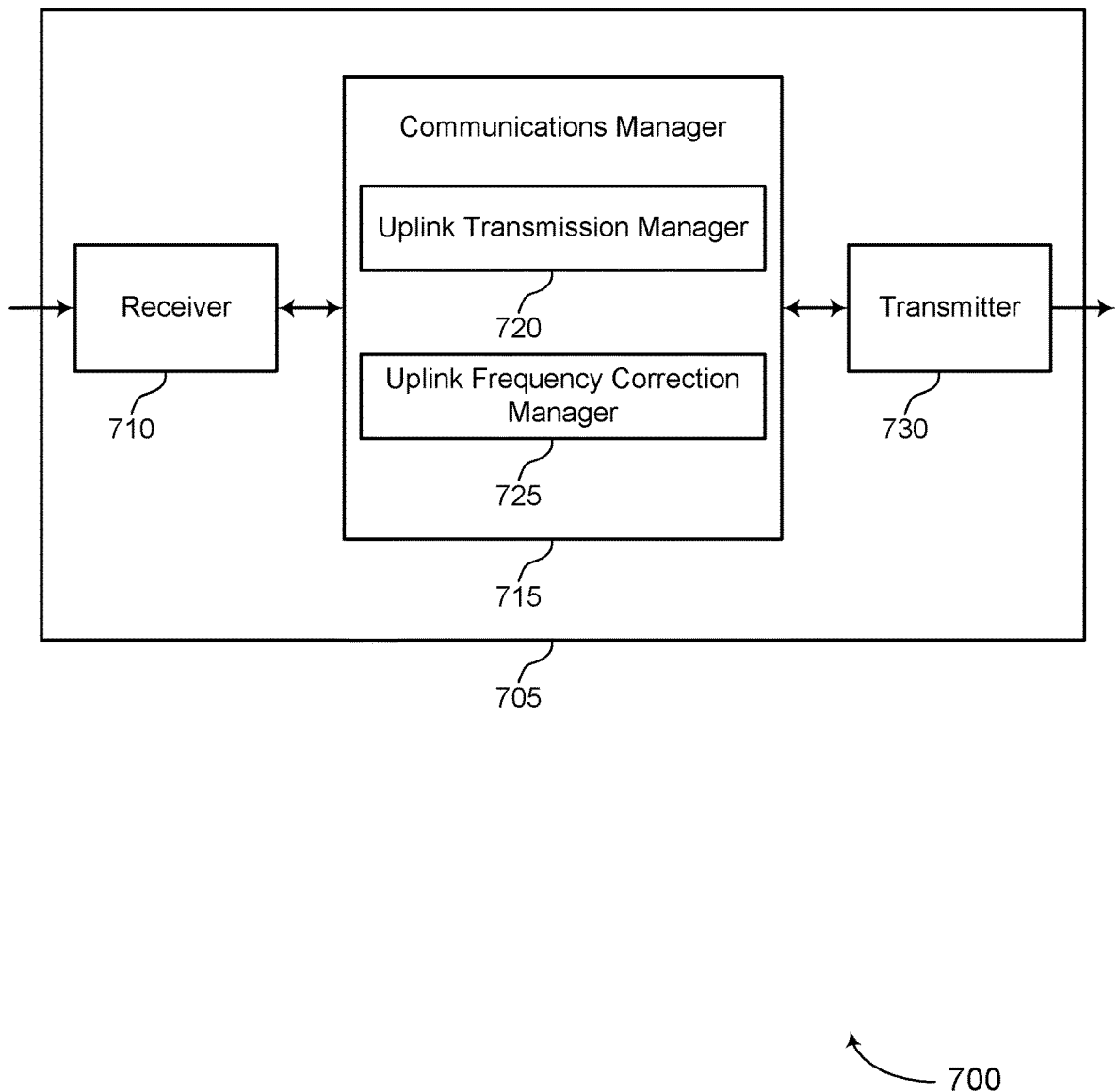

FIG. 7 shows a block diagram 700 of a device 705 that supports closed loop frequency correction for NTN systems in accordance with aspects of the present disclosure. The device 705 may be an example of aspects of a device 605, or a UE 115 as described herein. The device 705 may include a receiver 710, a communications manager 715, and a transmitter 730. The communications manager 715 can be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to closed loop frequency correction for NTN systems, etc.). The receiver 710 may pass the received information, or information derived from it, to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an uplink transmission manager 720 and an uplink frequency correction manager 725. The communications manager 715 may be an example of aspects of the communications manager 910 described herein.

The uplink transmission manager 720 may transmit, based on an initial uplink frequency, a first uplink signal to an upstream network node of an NTN. The uplink frequency correction manager 725 may receive an indication of an uplink frequency correction in response to the transmitted first uplink signal and determine a corrected uplink frequency based on the initial uplink frequency and the received indication of the uplink frequency correction. The uplink transmission manager 720 may then transmit, based on the corrected uplink frequency, a second uplink signal to the upstream network node.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
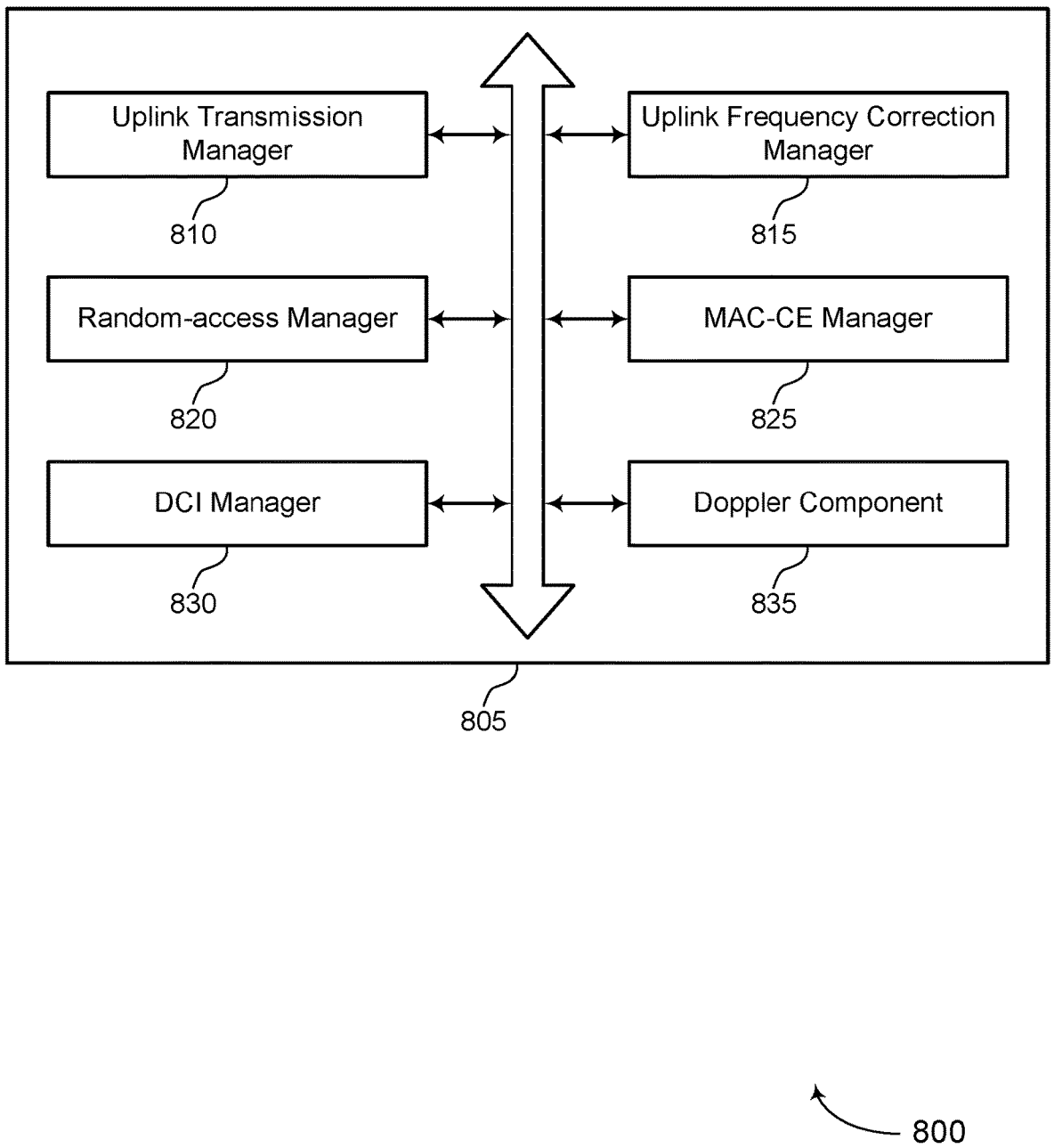
FIG. 8 shows a block diagram of a communications manager that supports closed loop frequency correction for NTN systems in accordance with aspects of the present disclosure.

FIG. 8 shows a block diagram 800 of a communications manager 805 that supports closed loop frequency correction for NTN systems in accordance with aspects of the present disclosure. The communications manager 805 may be an example of aspects of a communications manager 615, a communications manager 715, or a communications manager 910 described herein. The communications manager 805 may include an uplink transmission manager 810, an uplink frequency correction manager 815, a random access manager 820, a MAC-CE manager 825, a DCI manager 830, and a doppler component 835. Each of these modules may communicate, directly or indirectly, with one another (for example, via one or more buses).

The uplink transmission manager 810 may transmit, based on an initial uplink frequency, a first uplink signal to an upstream network node of an NTN. The uplink frequency correction manager 815 may receive an indication of an uplink frequency correction in response to the transmitted first uplink signal. The uplink frequency correction manager 815 may determine a corrected uplink frequency based on the initial uplink frequency and the received indication of the uplink frequency correction. The uplink transmission manager 810 may transmit, based on the corrected uplink frequency, a second uplink signal to the upstream network node.

In some examples, transmitting the first uplink signal includes transmitting a random access preamble, and receiving the indication of the uplink frequency correction includes receiving a response to the transmitted preamble, the response including the indication of the uplink frequency correction (for example, a RAR message, also known as a random access message2). In some examples, the first uplink signal includes an SRS or a data signal. The MAC-CE manager 825 may receive a MAC-CE including the indication of the uplink frequency correction. In some examples, the MAC-CE manager 825 may receive a data transmission, the received MAC-CE associated with the data transmission (for example, the MAC-CE may be received in a MAC header in the data transmission).

In some implementations, DCI manager 830 may receive the indication of the uplink frequency correction in DCI. In some implementations, the received DCI further includes an uplink grant for the UE, and the UE may transmit the second uplink signal based on the uplink grant and the corrected uplink frequency. In some implementations, the DCI manager 830 may receive a group uplink frequency correction command in DCI for a group of UEs. In some examples, the random access manager 820 may estimate, for a random access preamble, a frequency error associated with communications between the UE and the upstream network node. In some examples, the random access manager 820 may identify a target frequency for the random access preamble and determine the initial uplink frequency based on the identified target frequency and the estimated frequency error, where the transmitted first uplink signal includes the random access preamble.

The Doppler component 835 may determine a speed associated with the network node, for example, a relative speed between the UE and the upstream network node (in the case that the network node is a satellite) or between the UE and a satellite associated with the upstream network node (in the case that the upstream network node is a ground-level base station utilizing the satellite as a relay). In some examples, the Doppler component 835 may identify a Doppler shift associated with the determined relative speed. In some examples, the Doppler component 835 may estimate the frequency error based on the identified Doppler shift.

In some examples, the uplink transmission manager 810 may transmit uplink transmissions, including the first uplink signal and the second uplink signal, on at least one of a first set of carrier frequencies. In some examples, the uplink frequency correction manager 815 may receive downlink transmissions, including the indication of the uplink frequency correction, on at least one of a second set of carrier frequencies different from the first set of carrier frequencies. In some implementations, the first set of carrier frequencies and the second set of carrier frequencies are separated in frequency by at least one (1) gigahertz. In some implementations, the first set of carrier frequencies and the second set of carrier frequencies are in a $K_a$ band.

Figure 9:
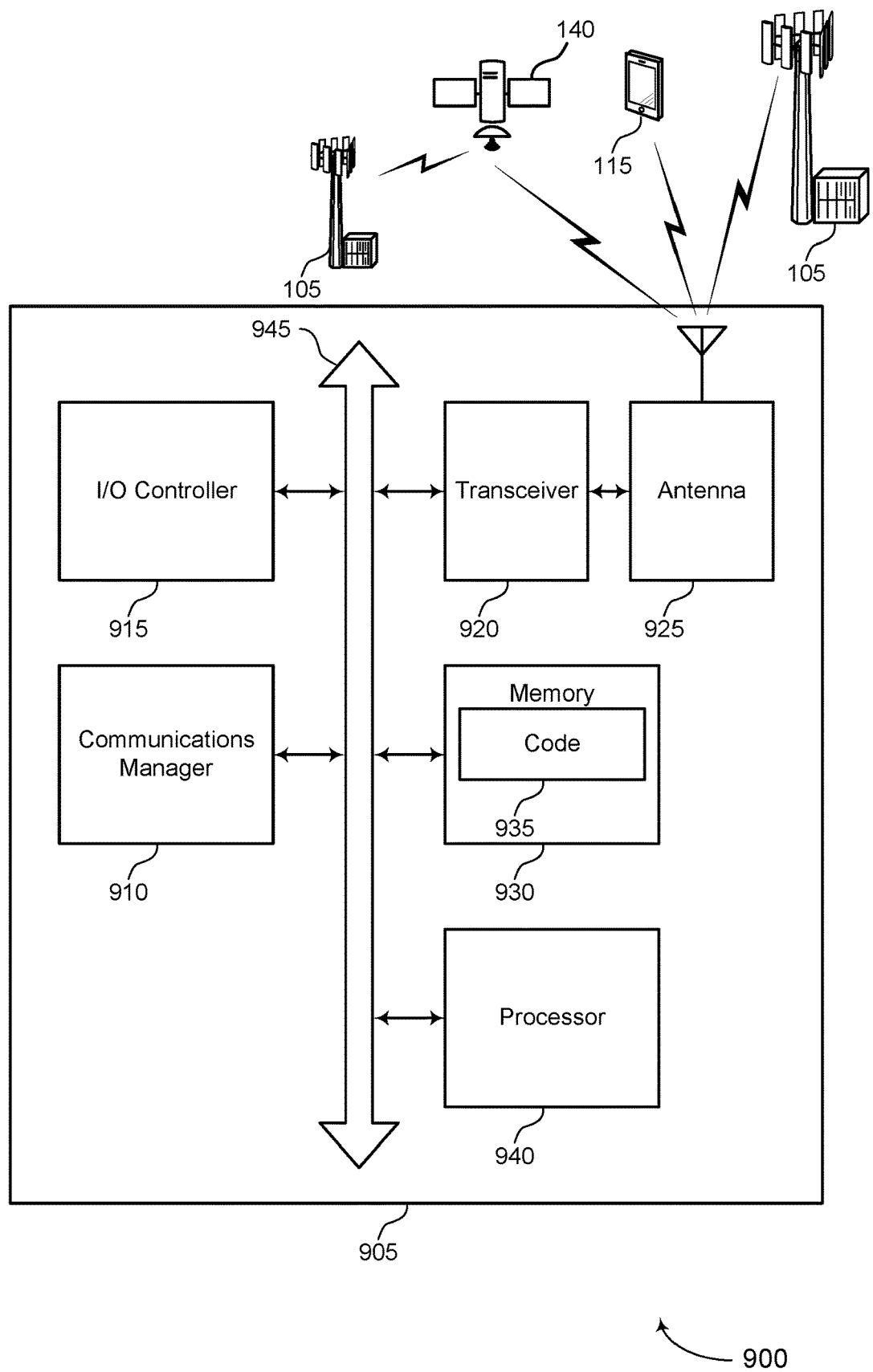
FIG. 9 shows a diagram of a system including a device that supports closed loop frequency correction for NTN systems in accordance with aspects of the present disclosure.

FIG. 9 shows a diagram of a system 900 including a device 905 that supports closed loop frequency correction for NTN systems in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (for example, bus 945). In some configurations, some or all of these components may be implemented in a single chip, chipset, SoC or IC package.

The communications manager 910 may transmit, based on an initial uplink frequency, a first uplink signal to an upstream network node of an NTN, and receive an indication of an uplink frequency correction in response to the transmitted first uplink signal. The communications manager 910 may then determine a corrected uplink frequency based on the initial uplink frequency and the received indication of the uplink frequency correction, and transmit, based on the corrected uplink frequency, a second uplink signal to the upstream network node.

The I/O controller 915 may manage input and output signals for the device 905. The I/O controller 915 may also manage peripherals not integrated into the device 905. In some implementations, the I/O controller 915 may represent a physical connection or port to an external peripheral. In some implementations, the I/O controller 915 may utilize an operating system such as iOS®, ANDROID®, MS-DOS®, MS-WINDOWS®, OS/2®, UNIX®, LINUX®, or another known operating system. In other implementations, the I/O controller 915 may represent or interact with a modem, a keyboard, a mouse, a touchscreen, or a similar device. In some implementations, the I/O controller 915 may be implemented as part of a processor. In some implementations, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some implementations, the wireless device may include a single antenna 925. However, in some implementations the device may have more than one antenna 925, which may be capable of concurrently transmitting or receiving multiple wireless transmissions. Wireless device 905 may be configured to wirelessly communicate with a base station 105 directly, with a base station 105 via a satellite 140, or with a satellite 140 directly in some implementations. Wireless device 905 may also be configured to wirelessly communicate with other UEs 115.

The memory 930 may include random access memory (RAM) and read-only memory (ROM). The memory 930 may store computer-readable, computer-executable code 935 including instructions that, when executed, cause the processor to perform various functions described herein. In some implementations, the memory 930 may contain, among other things, a basic input/output system (BIOS) which may control basic hardware or software operation such as the interaction with peripheral components or devices.

The processor 940 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 940 may be configured to operate a memory array using a memory controller. In other implementations, a memory controller may be integrated into the processor 940. The processor 940 may be configured to execute computer-readable instructions stored in a memory (for example, the memory 930) to cause the device 905 to perform various functions (for example, functions or tasks supporting closed loop frequency correction for NTN systems).

The code 935 may include instructions to implement aspects of the present disclosure, including instructions to support wireless communications. The code 935 may be stored in a non-transitory computer-readable medium such as system memory or other type of memory. In some implementations, the code 935 may not be directly executable by the processor 940 but may cause a computer (for example, when compiled and executed) to perform functions described herein.

Figure 10:
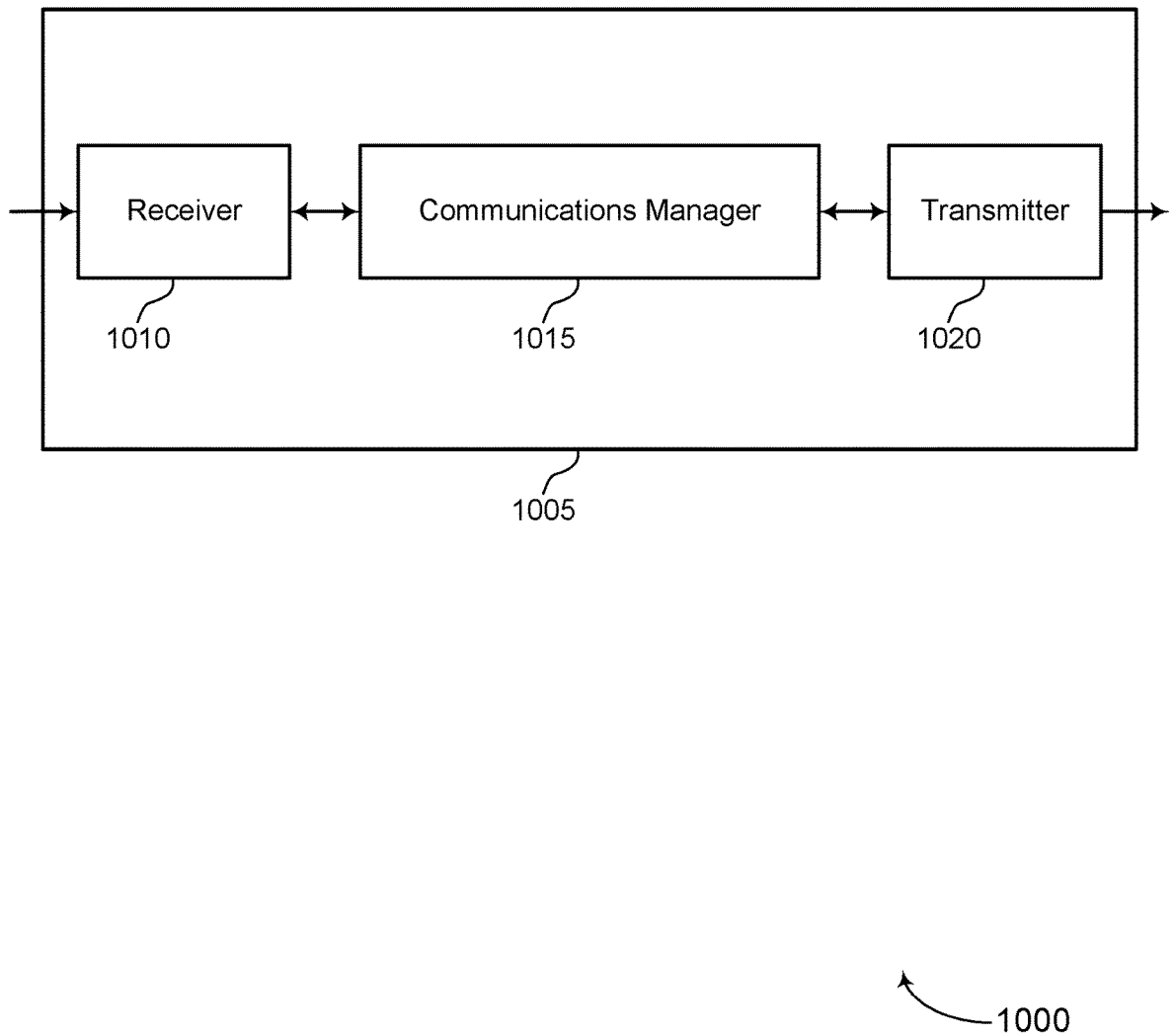
FIGS. 10 and 11 show block diagrams of devices that support closed loop frequency correction for NTN systems in accordance with aspects of the present disclosure.

FIG. 10 shows a block diagram 1000 of a device 1005 that supports closed loop frequency correction for NTN systems in accordance with aspects of the present disclosure. The device 1005 may be an example of aspects of a base station 105 as described herein. The device 1005 may include a receiver 1010, a communications manager 1015, and a transmitter 1020. The communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to closed loop frequency correction for NTN systems, etc.). The receiver 1010 may pass the received information, or information derived from it, to other components of the device 1005. The receiver 1010 may be an example of aspects of the transceiver 1320 described with reference to FIG. 13. The receiver 1010 may utilize a single antenna or a set of antennas.

The communications manager 1015 may receive a first uplink signal from a UE at a first frequency different from an expected frequency for uplink transmissions, and determine an uplink frequency correction for the UE based on the received first uplink signal. The communications manager 1015 may then transmit an indication of the uplink frequency correction to the UE. The communications manager 1015 may be an example of aspects of the communications manager 1310 described herein.

The communications manager 1015, or its sub-components, may be implemented in hardware, code (for example, software or firmware) executed by a processor, or any combination thereof. If at least partially implemented in code executed by a processor, the functions of the communications manager 1015, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1015, or its sub-components, may be collocated in a single device (for example, in a single chip, chipset, system-on-chip (SoC) or integrated circuit (IC) package) or physically located at different locations, including being distributed such that portions of functions are implemented at different physical locations by one or more respective physical components (such as in other chips, chipsets, SoCs or IC packages). In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
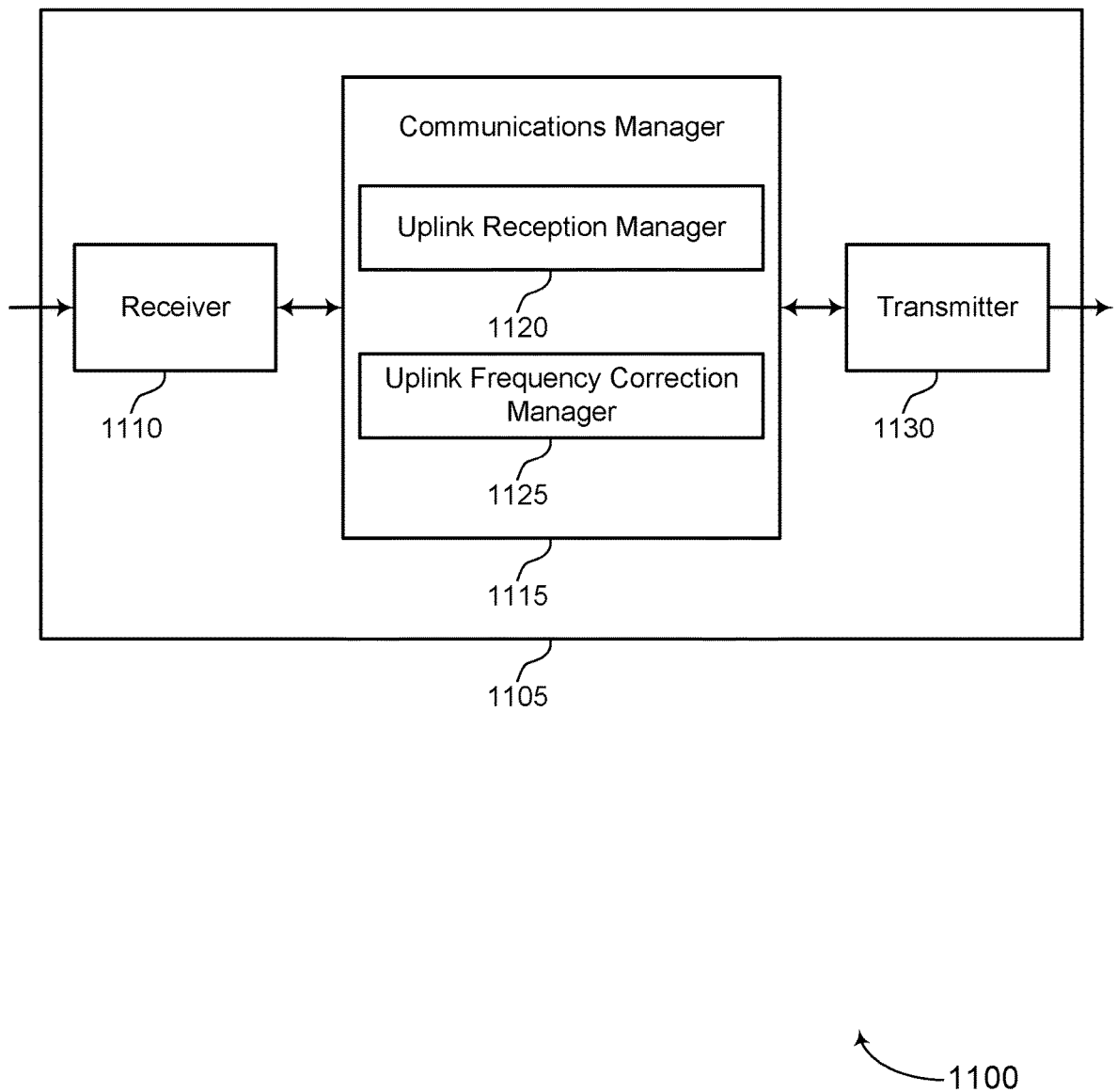

FIG. 11 shows a block diagram 1100 of a device 1105 that supports closed loop frequency correction for NTN systems in accordance with aspects of the present disclosure. The device 1105 may be an example of aspects of a device 1005, or a base station 105 as described herein. The device 1105 may include a receiver 1110, a communications manager 1115, and a transmitter 1130. The communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to closed loop frequency correction for NTN systems, etc.). The receiver 1110 may pass the received information, or information derived from it, to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an uplink reception manager 1120 and an uplink frequency correction manager 1125. The communications manager 1115 may be an example of aspects of the communications manager 1310 described herein.

The uplink reception manager 1120 may receive a first uplink signal from a UE at a first frequency different from an expected frequency for uplink transmissions. The uplink frequency correction manager 1125 may determine an uplink frequency correction for the UE based on the received first uplink signal and transmit an indication of the uplink frequency correction to the UE.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
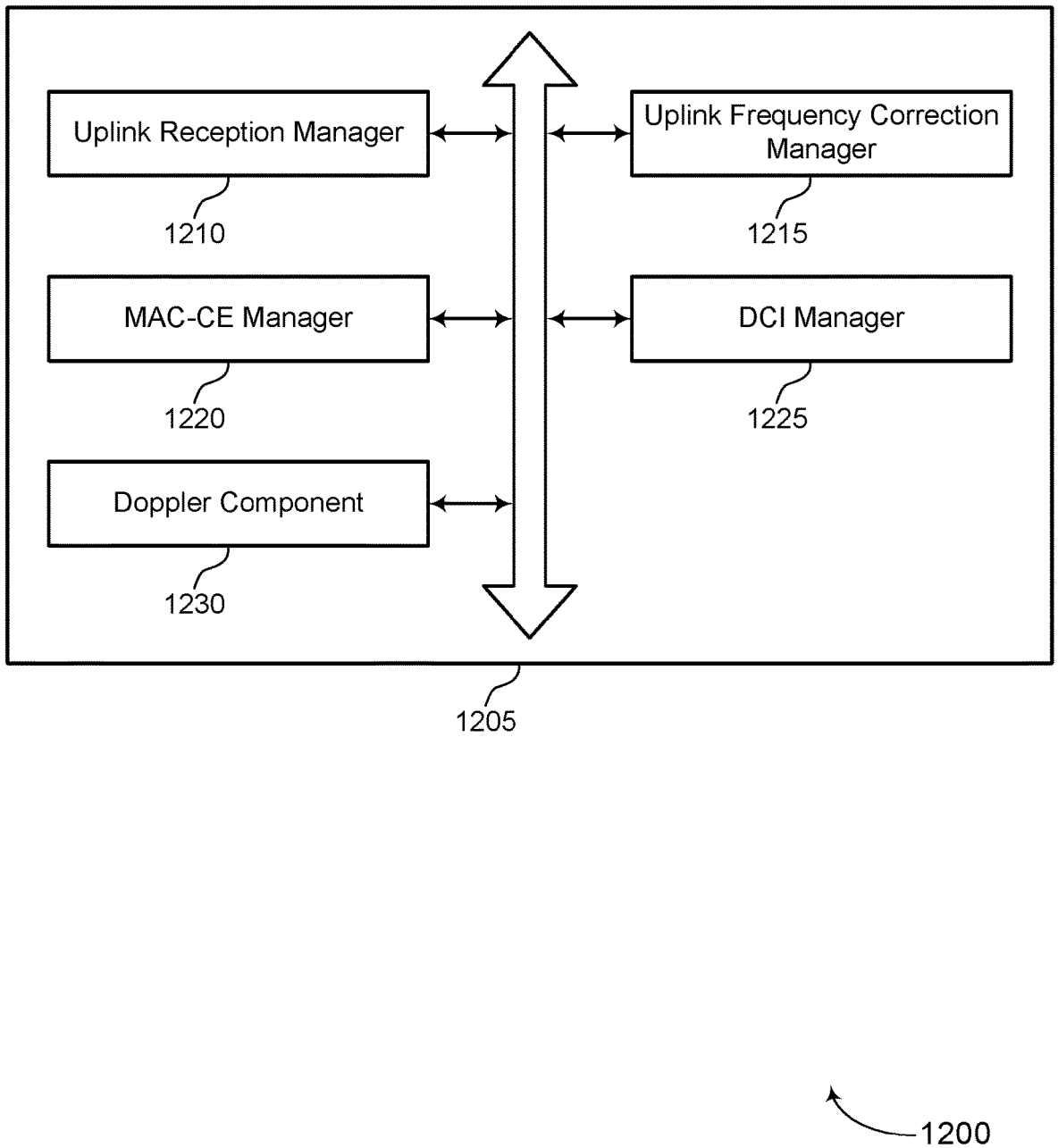
FIG. 12 shows a block diagram of a communications manager that supports closed loop frequency correction for NTN systems in accordance with aspects of the present disclosure.

FIG. 12 shows a block diagram 1200 of a communications manager 1205 that supports closed loop frequency correction for NTN systems in accordance with aspects of the present disclosure. The communications manager 1205 may be an example of aspects of a communications manager 1015, a communications manager 1115, or a communications manager 1310 described herein. The communications manager 1205 may include an uplink reception manager 1210, an uplink frequency correction manager 1215, a MAC-CE manager 1220, a DCI manager 1225, and a Doppler component 1230. Each of these modules may communicate, directly or indirectly, with one another (for example, via one or more buses).

The uplink reception manager 1210 may receive a first uplink signal from a UE at a first frequency different from an expected frequency for uplink transmissions. The uplink frequency correction manager 1215 may determine an uplink frequency correction for the UE based on the received first uplink signal. In some examples, the uplink frequency correction manager 1215 may transmit an indication of the uplink frequency correction to the UE. In some examples, the uplink reception manager 1210 may receive, in response to the transmitted indication of the uplink frequency correction, a second uplink signal from the UE at the expected frequency. In some examples, receiving the first uplink signal includes receiving a random access preamble. In some examples, transmitting the indication of the uplink frequency correction includes transmitting a response to the received random access preamble, the response including the indication of the uplink frequency correction (for example, a RAR message, also known as a random access message2). In some examples, the first uplink signal includes an SRS or a data signal.

The MAC-CE manager 1220 may transmit a MAC-CE including the indication of the uplink frequency correction. In some examples, the MAC-CE manager 1220 may transmit the MAC-CE with an associated data signal (for example, the MAC-CE may be transmitted in a MAC header of a data transmission including the data signal). The DCI manager 1225 may transmit DCI including the indication of the uplink frequency correction. In some implementations, the transmitted DCI further includes an uplink grant for the UE. In some implementations, the indication of the uplink frequency correction is a group uplink frequency correction command, and the DCI is for a group of UEs.

In some examples, determining the uplink frequency correction for the UE includes determining a difference in frequency between the first frequency and the expected frequency, where the uplink frequency correction includes the difference in frequency. The Doppler component 1230 may estimate a relative speed between the UE and the upstream network node. In some examples, the Doppler component 1230 may identify a Doppler shift associated with the determined relative speed. In some examples, the Doppler component 1230 may determine the uplink frequency correction based on the expected frequency and the identified Doppler shift.

In some implementations, the uplink reception manager 1210 may receive the uplink transmissions, including the first uplink signal, on at least one of a first set of carrier frequencies. In some examples, the uplink frequency correction manager 1215 may transmit downlink transmissions, including the indication of the uplink frequency correction, on at least one of a second set of carrier frequencies different from the first set of carrier frequencies. In some implementations, the first set of carrier frequencies and the second set of carrier frequencies are separated in frequency by at least one (1) gigahertz. In some implementations, the first set of carrier frequencies and the second set of carrier frequencies are in a $K_a$ band.

Figure 13:
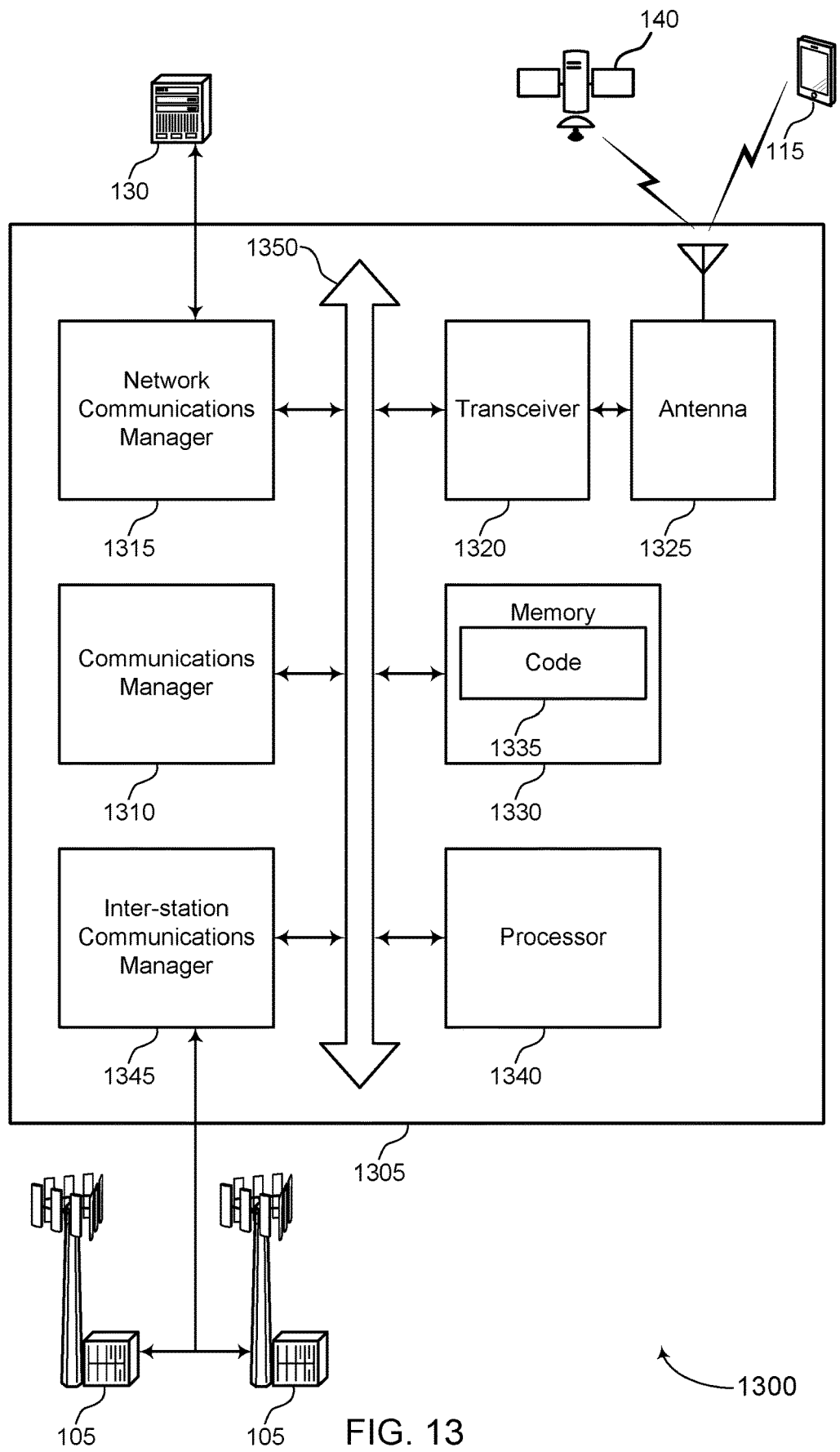
FIG. 13 shows a diagram of a system including a device that supports closed loop frequency correction for NTN systems in accordance with aspects of the present disclosure.

FIG. 13 shows a diagram of a system 1300 including a device 1305 that supports closed loop frequency correction for NTN systems in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (for example, bus 1350).

The communications manager 1310 may receive a first uplink signal from a UE at a first frequency different from an expected frequency for uplink transmissions, determine an uplink frequency correction for the UE based on the received first uplink signal, and transmit an indication of the uplink frequency correction to the UE.

The network communications manager 1315 may manage communications with the core network (for example, via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some implementations, the wireless device may include a single antenna 1325. However, in some implementations the device may have more than one antenna 1325, which may be capable of concurrently transmitting or receiving multiple wireless transmissions. Wireless device 1305 may be configured to wirelessly communicate with UEs 115 directly in some implementations, for example where wireless device 1305 is a component of a satellite of an NTN system. In other implementations, wireless device 1305 may be configured to wirelessly communicate with one or more UEs 115, or with other wireless devices, via a satellite 140 of the NTN system.

The memory 1330 may include RAM, ROM, or a combination thereof. The memory 1330 may store computer-readable code 1335 including instructions that, when executed by a processor (for example, the processor 1340) cause the device to perform various functions described herein. In some implementations, the memory 1330 may contain, among other things, a BIOS which may control basic hardware or software operation such as the interaction with peripheral components or devices.

The processor 1340 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 1340 may be configured to operate a memory array using a memory controller. In some implementations, a memory controller may be integrated into processor 1340. The processor 1340 may be configured to execute computer-readable instructions stored in a memory (for example, the memory 1330) to cause the device 1305 to perform various functions (for example, functions or tasks supporting closed loop frequency correction for NTN systems).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some implementations, the code 1335 may not be directly executable by the processor 1340 but may cause a computer (for example, when compiled and executed) to perform functions described herein.

Figure 14:
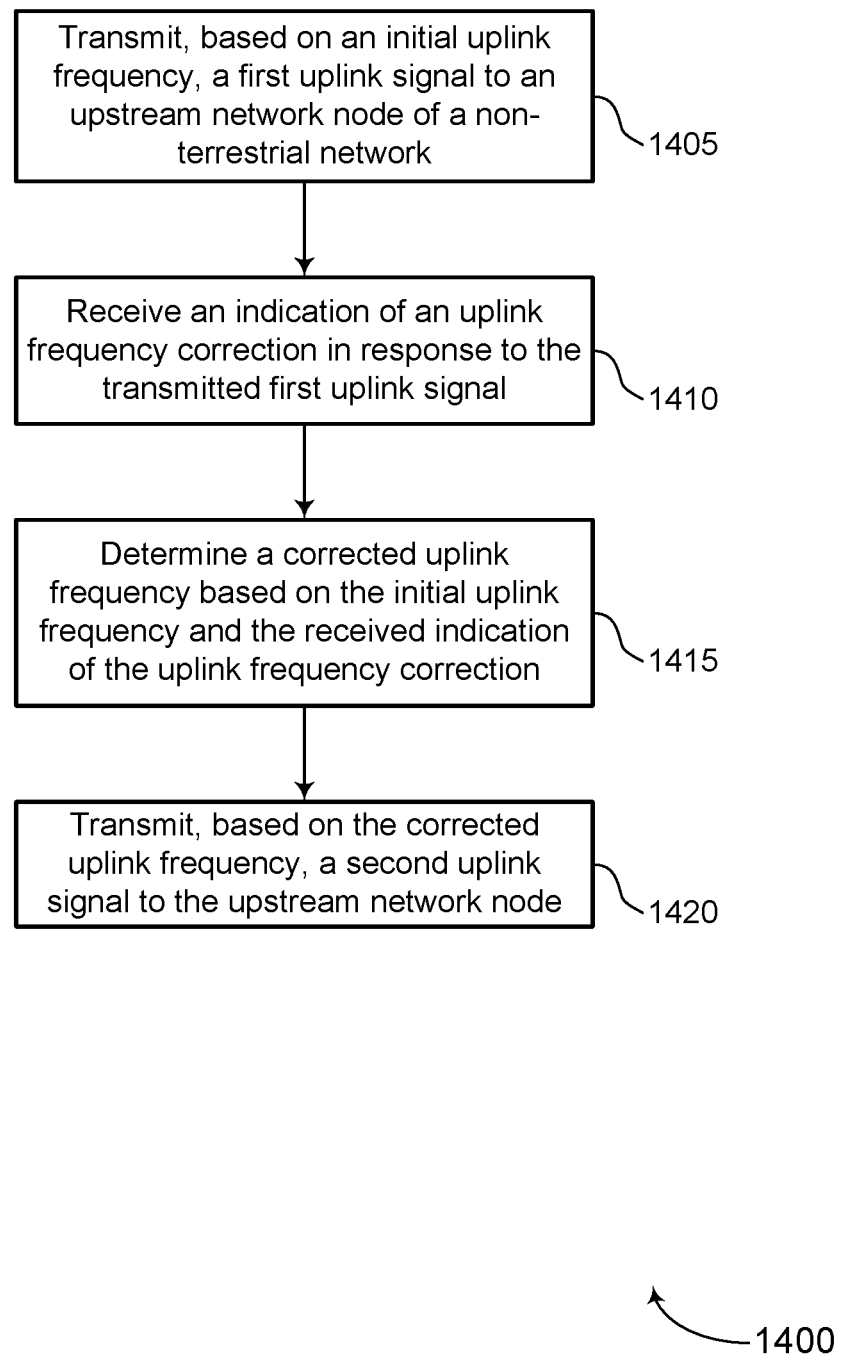
FIGS. 14 and 15 show flowcharts illustrating methods that support closed loop frequency correction for NTN systems in accordance with aspects of the present disclosure.

FIG. 14 shows a flowchart illustrating a method 1400 that supports closed loop frequency correction for NTN systems in accordance with aspects of the present disclosure. The operations of method 1400 may be implemented by a UE 115 or its components as described herein. For example, the operations of method 1400 may be performed by a communications manager as described with reference to FIGS. 6-9. In some examples, a UE may execute a set of instructions to control the functional elements of the UE to perform the functions described below. Additionally, or alternatively, a UE may perform aspects of the functions described below using special-purpose hardware.

At 1405, the UE may transmit, based on an initial uplink frequency, a first uplink signal to an upstream network node of an NTN. The operations of 1405 may be performed according to the methods described herein. In some examples, aspects of the operations of 1405 may be performed by an uplink transmission manager as described with reference to FIGS. 6-9.

At 1410, the UE may receive an indication of an uplink frequency correction in response to the transmitted first uplink signal. The operations of 1410 may be performed according to the methods described herein. In some examples, aspects of the operations of 1410 may be performed by an uplink frequency correction manager as described with reference to FIGS. 6-9.

At 1415, the UE may determine a corrected uplink frequency based on the initial uplink frequency and the received indication of the uplink frequency correction. The operations of 1415 may be performed according to the methods described herein. In some examples, aspects of the operations of 1415 may be performed by an uplink frequency correction manager as described with reference to FIGS. 6-9.

At 1420, the UE may transmit, based on the corrected uplink frequency, a second uplink signal to the upstream network node. The operations of 1420 may be performed according to the methods described herein. In some examples, aspects of the operations of 1420 may be performed by an uplink transmission manager as described with reference to FIGS. 6-9.

Figure 15:
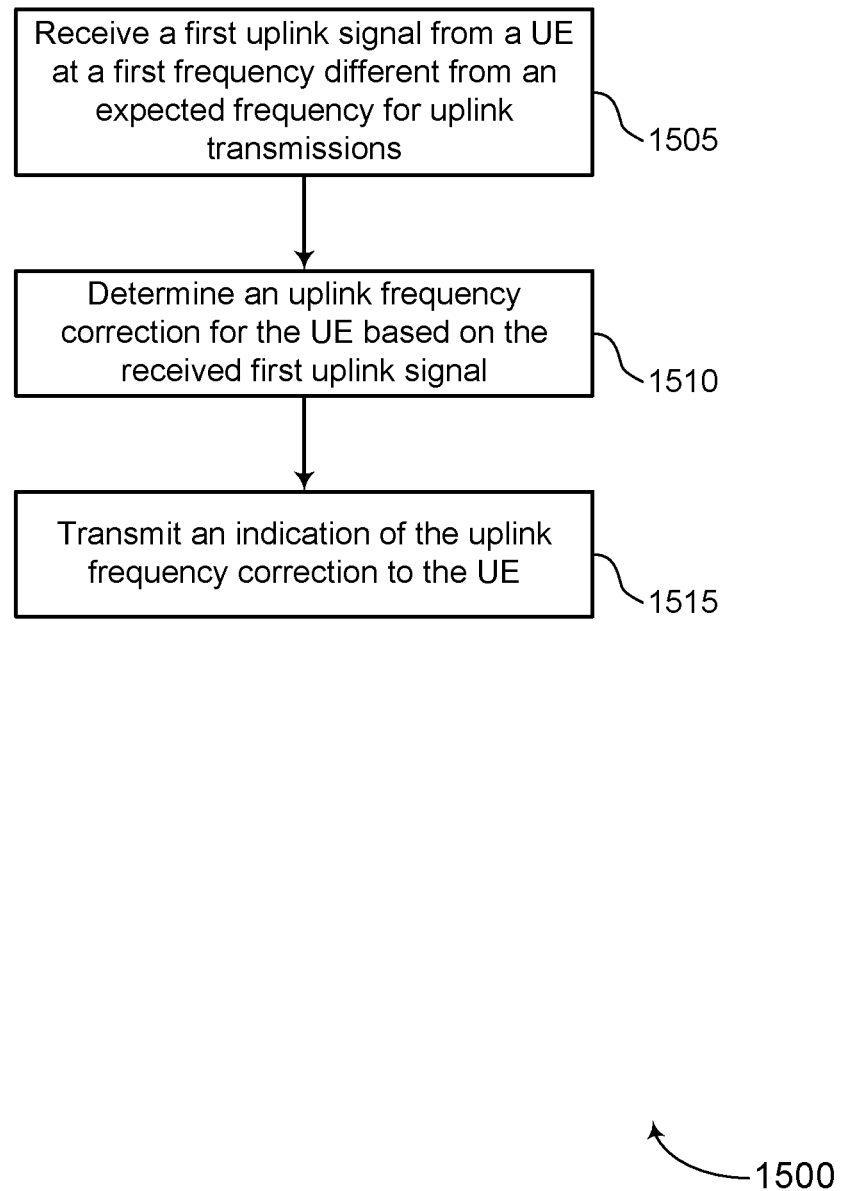

FIG. 15 shows a flowchart illustrating a method 1500 that supports closed loop frequency correction for NTN systems in accordance with aspects of the present disclosure. The operations of method 1500 may be implemented by a base station 105 or its components as described herein. For example, the operations of method 1500 may be performed by a communications manager as described with reference to FIGS. 10-13. In some examples, a satellite or base station may execute a set of instructions to control the functional elements of the base station to perform the functions described below. Additionally, or alternatively, a satellite or base station may perform aspects of the functions described below using special-purpose hardware.

At 1505, the satellite or base station may receive a first uplink signal from a UE at a first frequency different from an expected frequency for uplink transmissions. The operations of 1505 may be performed according to the methods described herein. In some examples, aspects of the operations of 1505 may be performed by an uplink reception manager as described with reference to FIGS. 10-13.

At 1510, the satellite or base station may determine an uplink frequency correction for the UE based on the received first uplink signal. The operations of 1510 may be performed according to the methods described herein. In some examples, aspects of the operations of 1510 may be performed by an uplink frequency correction manager as described with reference to FIGS. 10-13.

At 1515, the satellite or base station may transmit an indication of the uplink frequency correction to the UE. The operations of 1515 may be performed according to the methods described herein. In some examples, aspects of the operations of 1515 may be performed by an uplink frequency correction manager as described with reference to FIGS. 10-13.

It should be noted that the methods described herein describe possible implementations, and that the operations may be rearranged or otherwise modified and that other implementations are possible. Further, aspects from two or more of the methods may be combined.

Techniques described herein may be related to or described in documents from the organization named "3rd Generation Partnership Project" (3GPP), such as the 3GPP Radio Access Network 1 (RAN1) NTN track. Further, techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from 3GPP. CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (for example, several kilometers in radius) and may allow unrestricted access by UEs with service subscriptions with the network provider. A small cell may be associated with a lower-powered base station, as compared with a macro cell, and a small cell may operate in the same or different (for example, licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (for example, a home) and may provide restricted access by UEs having an association with the femto cell (for example, UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (for example, two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
estimating a frequency error associated with communications between the UE and an upstream network node of a non-terrestrial network;
determining an initial uplink frequency based at least in part on the frequency error and a target frequency for a first uplink signal associated with reducing interference;
transmitting, based at least in part on the initial uplink frequency, the first uplink signal to the upstream network node;
receiving an indication of an uplink frequency correction in response to the transmitted first uplink signal;
determining a corrected uplink frequency based at least in part on the initial uplink frequency and the received indication of the uplink frequency correction; and
transmitting, based at least in part on the corrected uplink frequency, a second uplink signal to the upstream network node.

2. The method of claim 1, wherein:
transmitting the first uplink signal comprises transmitting a random access preamble; and
receiving the indication of the uplink frequency correction comprises receiving a response to the transmitted random access preamble, the response comprising the indication of the uplink frequency correction.

3. The method of claim 1, wherein the first uplink signal comprises a sounding reference signal.

4. The method of claim 1, wherein receiving the indication of the uplink frequency correction comprises receiving a media access control (MAC) control element comprising the indication of the uplink frequency correction.

5. The method of claim 4, further comprising receiving a data transmission, the received MAC control element associated with the data transmission.

6. The method of claim 1, wherein the indication of the uplink frequency correction is received in downlink control information.

7. The method of claim 6, wherein the received downlink control information further comprises an uplink grant for the UE, the second uplink signal transmitted based at least in part on the uplink grant and the corrected uplink frequency.

8. The method of claim 1, wherein receiving the indication of the uplink frequency correction comprises receiving a group uplink frequency correction command in downlink control information for a group of UEs.

9. The method of claim 1,
wherein the transmitted first uplink signal comprises a random access preamble.

10. The method of claim 9, wherein estimating the frequency error comprises:
determining a relative speed between the upstream network node and the UE;
identifying a Doppler shift associated with the determined relative speed; and
estimating the frequency error based at least in part on the identified Doppler shift.

11. The method of claim 1, wherein:
uplink transmissions, including the first uplink signal and the second uplink signal, are transmitted by the UE on at least one of a first set of carrier frequencies; and
downlink transmissions, including the indication of the uplink frequency correction, are received by the UE on at least one of a second set of carrier frequencies different from the first set of carrier frequencies.

12. A method for wireless communication at an upstream network node of a non-terrestrial network, comprising:
receiving a first uplink signal from a user equipment (UE) at a first frequency different than an expected frequency for uplink transmissions, wherein the first frequency is based at least in part on a frequency error and a target frequency associated with reducing interference;
determining an uplink frequency correction for the UE to transmit a second uplink signal based at least in part on the received first uplink signal and based at least in part on one or both of a location of the UE or a trajectory of the upstream network node;
transmitting an indication of the uplink frequency correction to the UE; and
receiving, based at least in part on the indication of the uplink frequency correction, the second uplink signal.

13. The method of claim 12, further comprising receiving, in response to the transmitted indication of the uplink frequency correction, the second uplink signal from the UE at the expected frequency.

14. The method of claim 12, wherein:
receiving the first uplink signal comprises receiving a random access preamble; and
transmitting the indication of the uplink frequency correction comprises transmitting a response to the received random access preamble, the response comprising the indication of the uplink frequency correction.

15. The method of claim 12, wherein the first uplink signal comprises a sounding reference signal.

16. The method of claim 12, wherein transmitting the indication of the uplink frequency correction comprises transmitting a media access control (MAC) control element comprising the indication of the uplink frequency correction.

17. The method of claim 16, further comprising transmitting the MAC control element with an associated data signal.

18. The method of claim 12, wherein the indication of the uplink frequency correction is transmitted in downlink control information.

19. The method of claim 18, wherein the transmitted downlink control information further comprises an uplink grant for the UE.

20. The method of claim 18, wherein the indication of the uplink frequency correction is a group uplink frequency correction command, and the downlink control information is for a group of UEs.

21. The method of claim 12, wherein determining the uplink frequency correction for the UE comprises determining a difference in frequency between the first frequency and the expected frequency, wherein the uplink frequency correction comprises the difference in frequency.

22. The method of claim 12, wherein determining the uplink frequency correction for the UE comprises:
estimating a relative speed between the UE and the upstream network node;
identifying a Doppler shift associated with the estimated relative speed; and
determining the uplink frequency correction based at least in part on the expected frequency and the identified Doppler shift.

23. The method of claim 12, wherein:
the uplink transmissions, including the first uplink signal, are received on at least one of a first set of carrier frequencies; and
downlink transmissions, including the indication of the uplink frequency correction, are transmitted on at least one of a second set of carrier frequencies different from the first set of carrier frequencies.

24. An apparatus for wireless communication at a user equipment (UE), comprising:
a processor,
memory in electronic communication with the processor; and
instructions stored in the memory and executable by the processor to cause the apparatus to:
estimate a frequency error associated with communications between the UE and an upstream network node of a non-terrestrial network;
determine an initial uplink frequency based at least in part on the frequency error and a target frequency for a first uplink signal associated with reducing interference;
transmit, based at least in part on the initial uplink frequency, the first uplink signal to the upstream network node;
receive an indication of an uplink frequency correction in response to the transmitted first uplink signal;
determine a corrected uplink frequency based at least in part on the initial uplink frequency and the received indication of the uplink frequency correction; and
transmit, based at least in part on the corrected uplink frequency, a second uplink signal to the upstream network node.

25. The apparatus of claim 24, wherein:
the instructions to transmit the first uplink signal are executable by the processor to cause the apparatus to transmit a random access preamble; and
the instructions to receive the indication of the uplink frequency correction are executable by the processor to cause the apparatus to receive a response to the transmitted preamble, the response comprising the indication of the uplink frequency correction.

26. The apparatus of claim 24, wherein the first uplink signal comprises a sounding reference signal.

27. The apparatus of claim 24, wherein the instructions are further executable by the processor to cause the apparatus to:
estimate, by the UE for a random access preamble, a frequency error associated with communications between the UE and the upstream network node;
identify the target frequency for the random access preamble; and
determine the initial uplink frequency based at least in part on the target frequency and the estimated frequency error, wherein the transmitted first uplink signal comprises the random access preamble.

28. An apparatus for wireless communication at an upstream network node of a non-terrestrial network, comprising:
a processor,
memory in electronic communication with the processor; and
instructions stored in the memory and executable by the processor to cause the apparatus to:
receive a first uplink signal from a user equipment (UE) at a first frequency different than an expected frequency for uplink transmissions, wherein the first frequency is based at least in part on a frequency error and a target frequency associated with reducing interference;
determine an uplink frequency correction for the UE to transmit a second uplink signal based at least in part on the received first uplink signal and based at least in part on one or both of a location of the UE or a trajectory of the upstream network node;
transmit an indication of the uplink frequency correction to the UE; and
receive, based at least in part on the indication of the uplink frequency correction, the second uplink signal.

29. The apparatus of claim 28, wherein the instructions are further executable by the processor to cause the apparatus to receive, in response to the transmitted indication of the uplink frequency correction, the second uplink signal from the UE at the expected frequency.

30. The apparatus of claim 28, wherein:
the instructions to receive the first uplink signal are executable by the processor to cause the apparatus to receive a random access preamble; and
the instructions to transmit the indication of the uplink frequency correction are executable by the processor to cause the apparatus to transmit a response to the received random access preamble, the response comprising the indication of the uplink frequency correction.

* * * * *